United States Patent
Fujimoto et al.

(10) Patent No.: US 11,335,374 B2
(45) Date of Patent: May 17, 2022

(54) MAGNETIC DISK DEVICE AND SECTOR PROCESSING METHOD

(71) Applicants: Kabushiki Kaisha Toshiba, Tokyo (JP); Toshiba Electronic Devices & Storage Corporation, Tokyo (JP)

(72) Inventors: Kazumi Fujimoto, Odawara Kanagawa (JP); Takao Furuhashi, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/179,626

(22) Filed: Feb. 19, 2021

(65) Prior Publication Data
US 2022/0068307 A1   Mar. 3, 2022

(30) Foreign Application Priority Data
Aug. 26, 2020   (JP) .............................. JP2020-142712

(51) Int. Cl.
*G11B 20/18*   (2006.01)
*G11B 19/04*   (2006.01)
*G11B 5/596*   (2006.01)
*G11B 21/10*   (2006.01)
*G11B 19/14*   (2006.01)

(52) U.S. Cl.
CPC ........ *G11B 19/045* (2013.01); *G11B 5/59655* (2013.01); *G11B 19/14* (2013.01); *G11B 21/106* (2013.01)

(58) Field of Classification Search
CPC ......... G11B 27/36; G11B 20/16; G11B 20/12; G11B 20/18; G11B 2020/183; G11B 19/04
USPC ...... 360/25, 31, 40, 48, 53; 369/53.1, 53.12, 369/53.15, 53.17, 53.42
See application file for complete search history.

(56) References Cited

U.S. PATENT DOCUMENTS

| | | | |
|---|---|---|---|
| 7,589,926 B2 | 9/2009 | Richmond et al. | |
| 7,911,725 B2 | 3/2011 | Yoshida et al. | |
| 8,339,723 B2* | 12/2012 | Yeung .................... | G11B 5/09 360/48 |
| 8,619,529 B1* | 12/2013 | Liew ...................... | G11B 20/18 369/53.17 |
| 8,908,307 B1 | 12/2014 | Yang et al. | |
| 2007/0025006 A1 | 2/2007 | Ichihara | |
| 2007/0263313 A1* | 11/2007 | Kitamura ........... | G11B 20/1833 360/69 |

FOREIGN PATENT DOCUMENTS

JP    H06-96526 A    4/1994
JP    H07-29312 A    1/1995

* cited by examiner

*Primary Examiner* — Nabil Z Hindi
(74) *Attorney, Agent, or Firm* — Allen & Overy LLP

(57) ABSTRACT

According to one embodiment, a magnetic disk device includes a disk having a first sector including first servo data, first user data, and first correction information used to correct a data error, a head that writes data to the disk and that reads data from the disk, and a controller that changes, according to a first defect length of a defect generated in the first sector in a circumferential direction of the disk, a first sector length of the first sector in the circumferential direction.

14 Claims, 17 Drawing Sheets

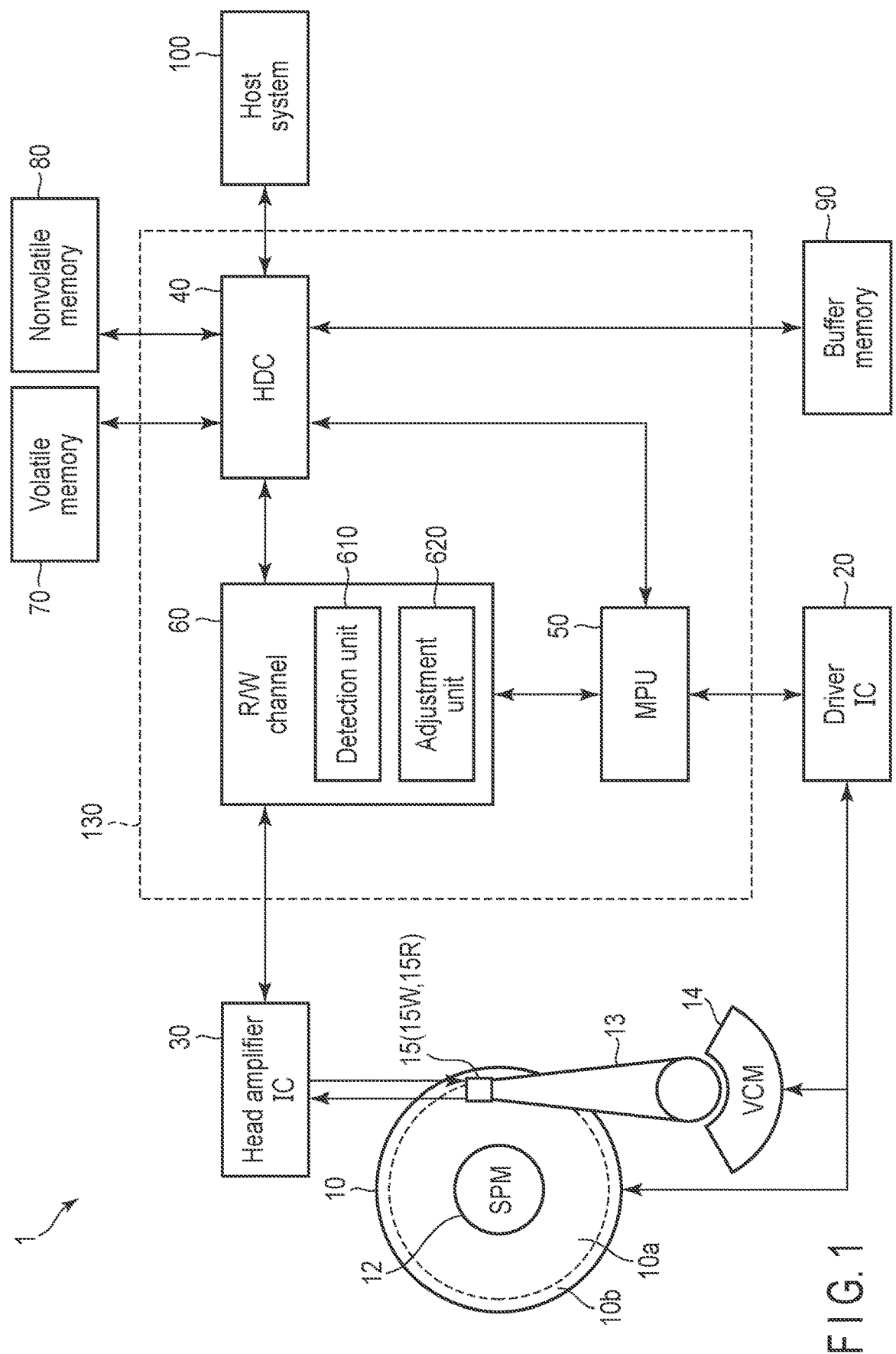
F I G. 1

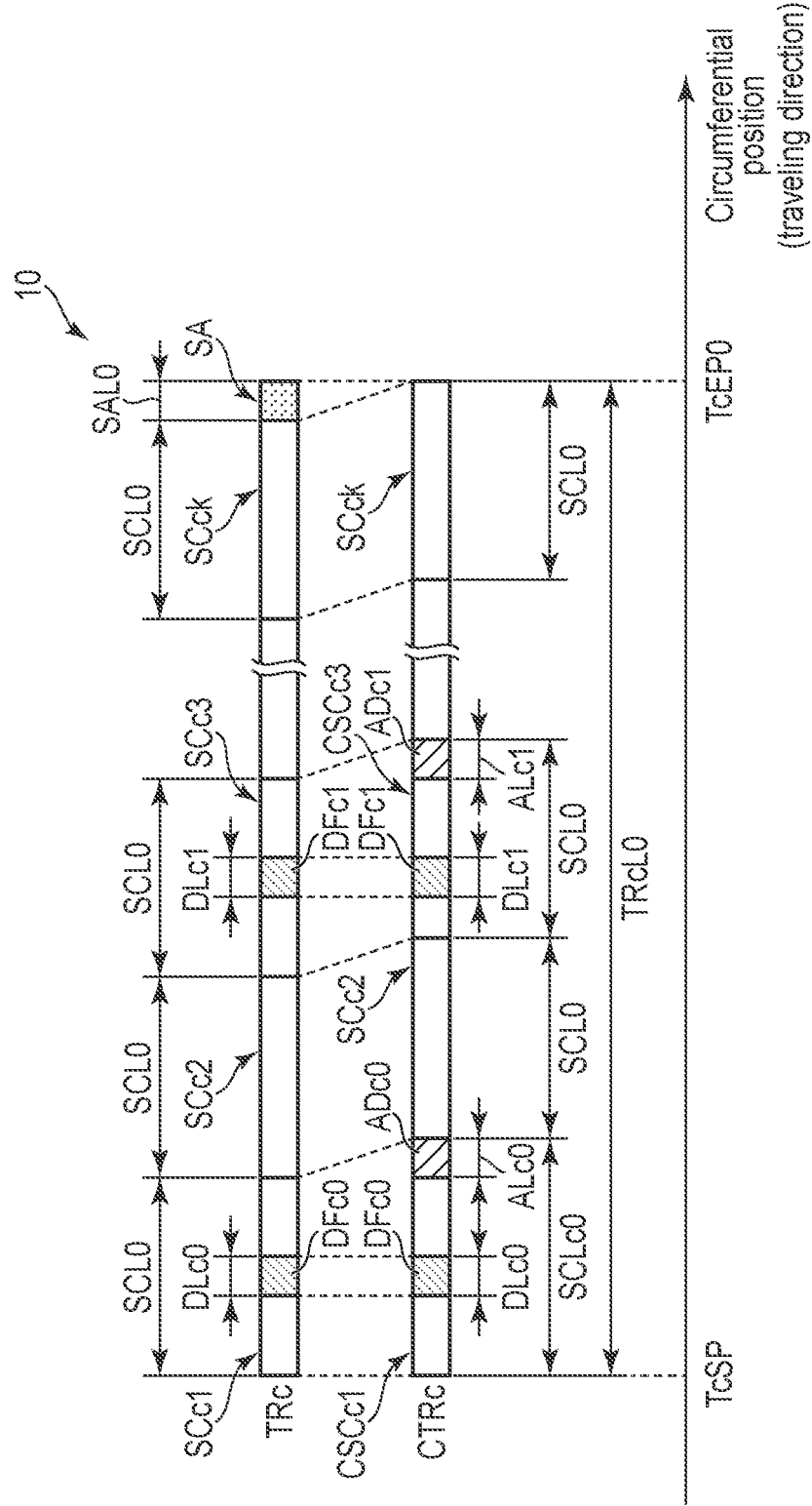
F I G. 6

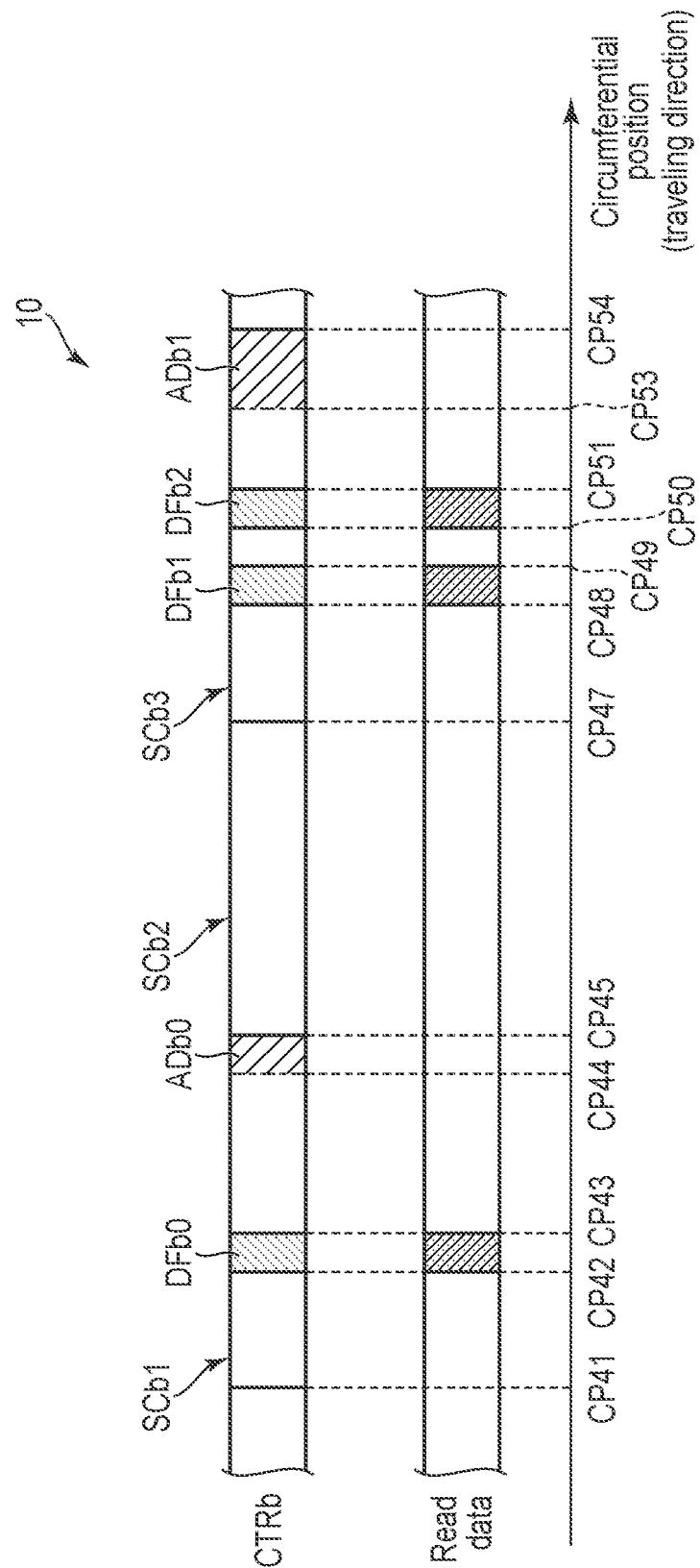
F I G. 11

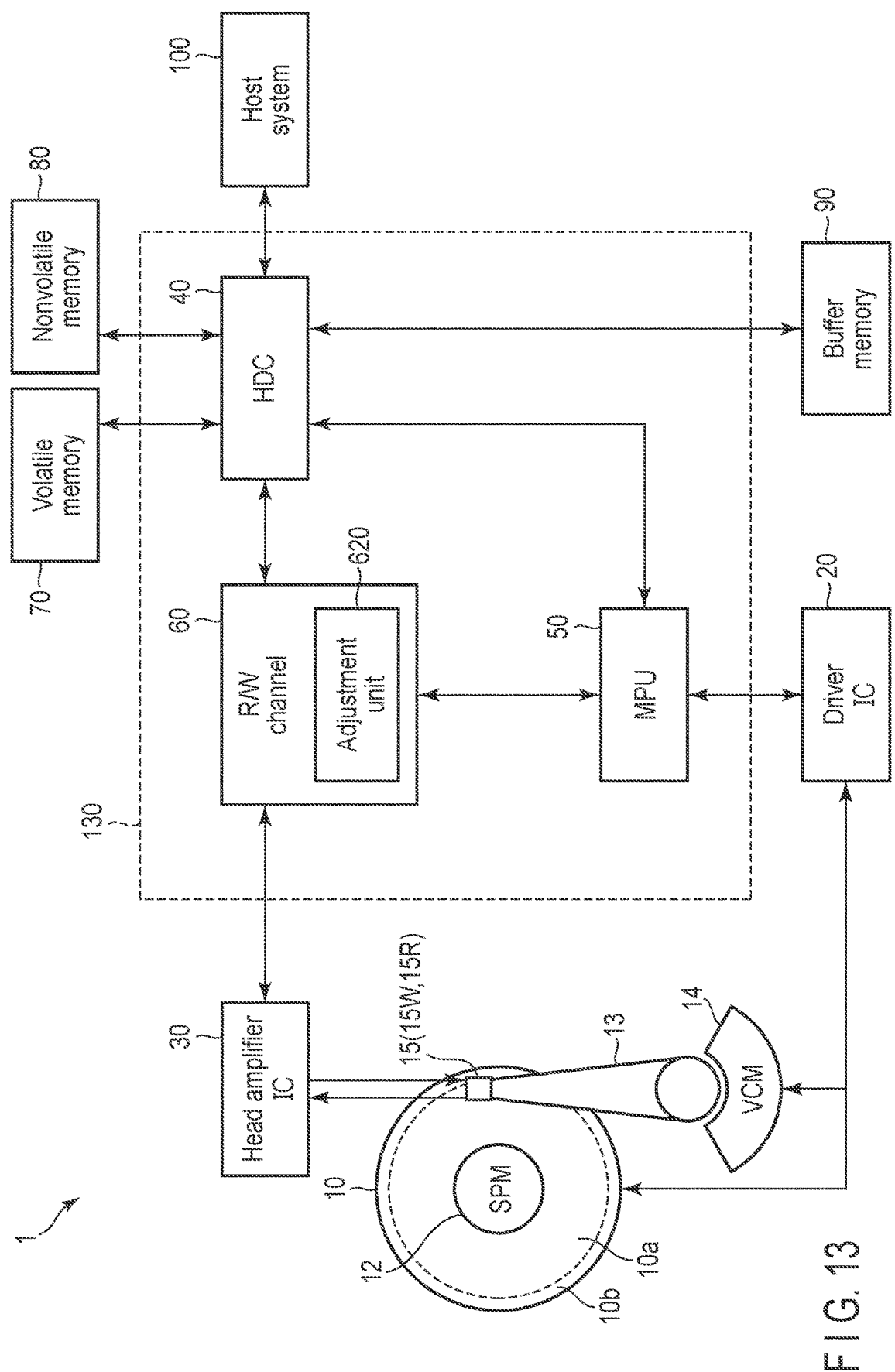
F I G. 13

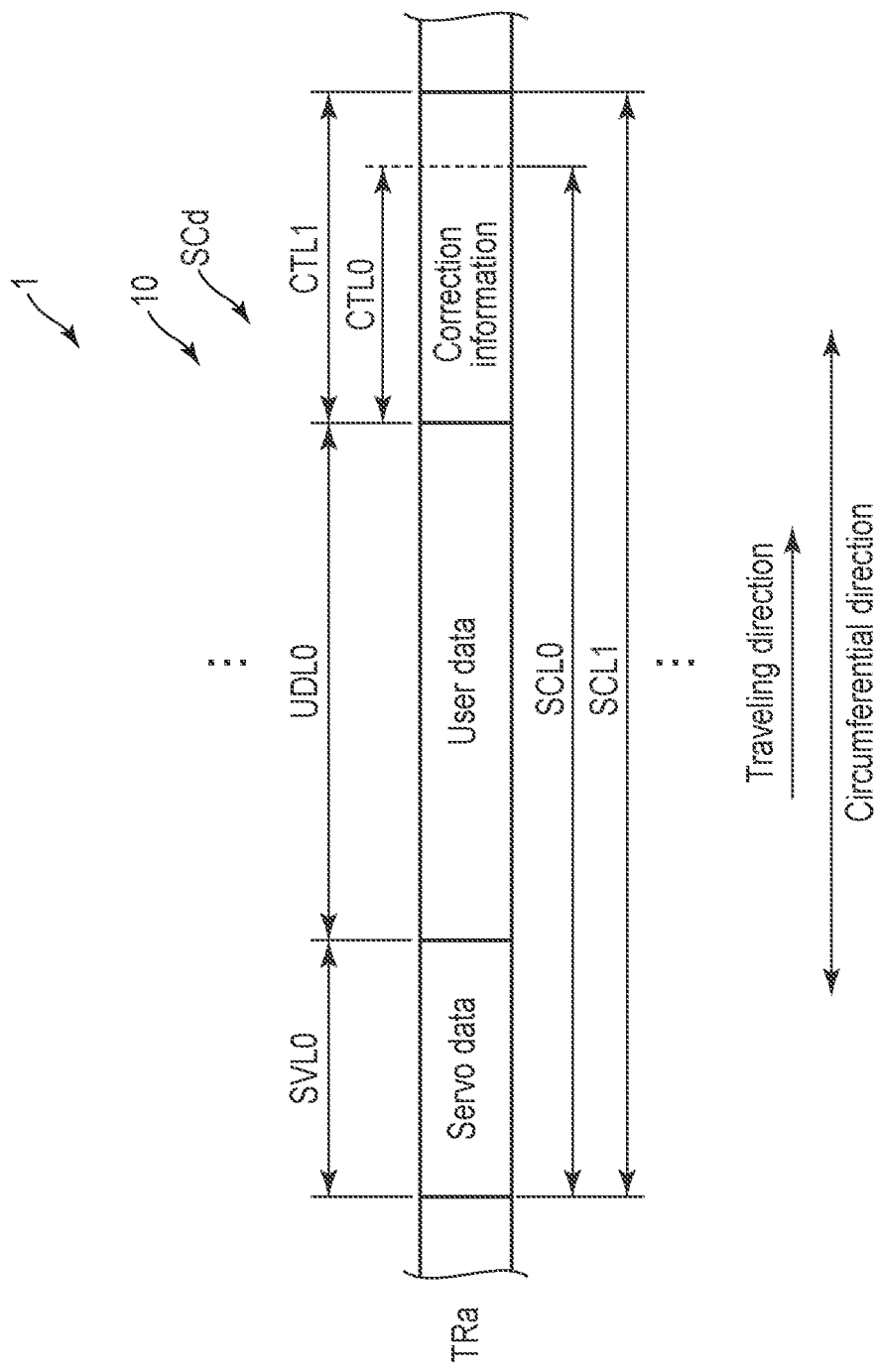
F I G. 14

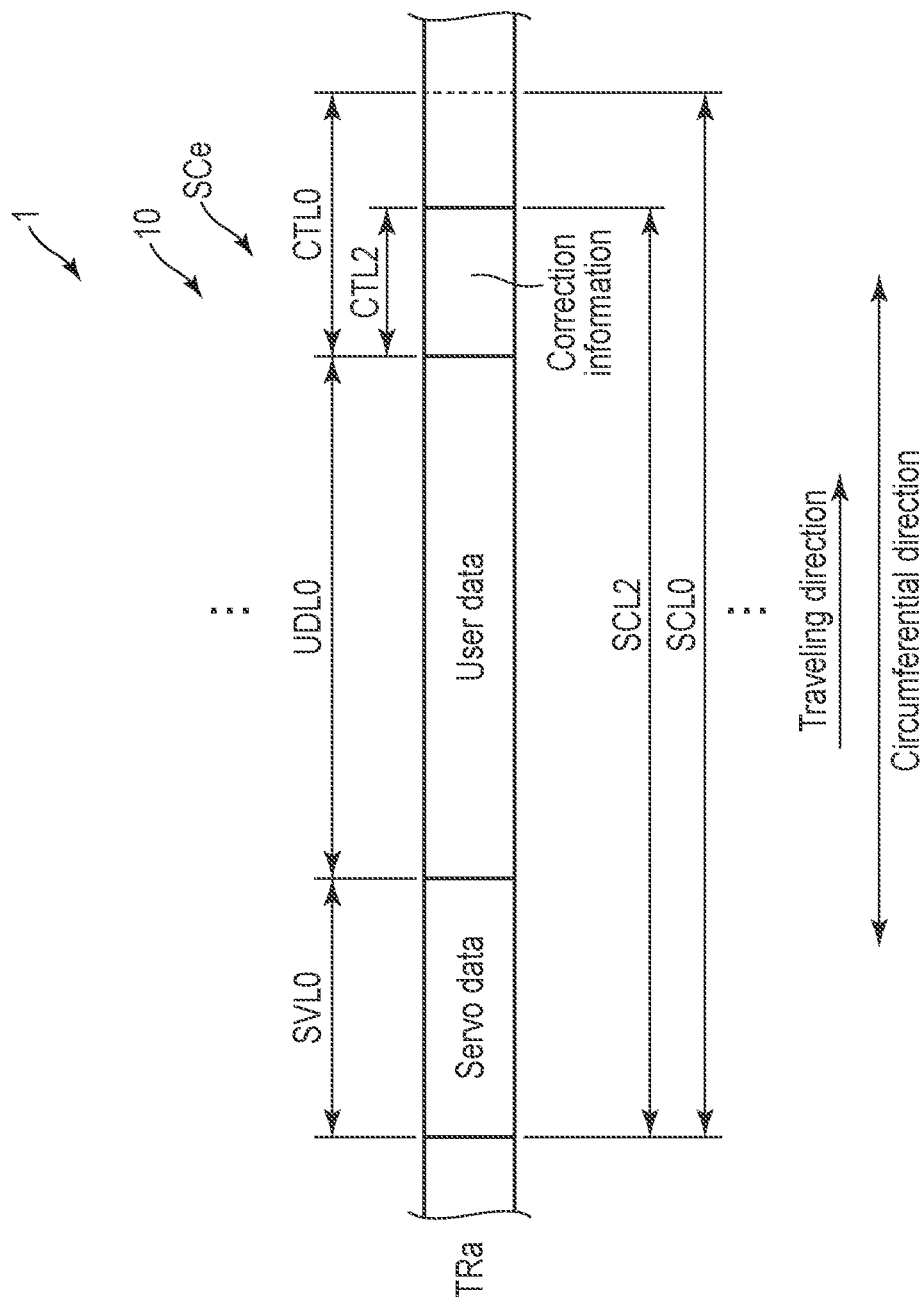
F I G. 15

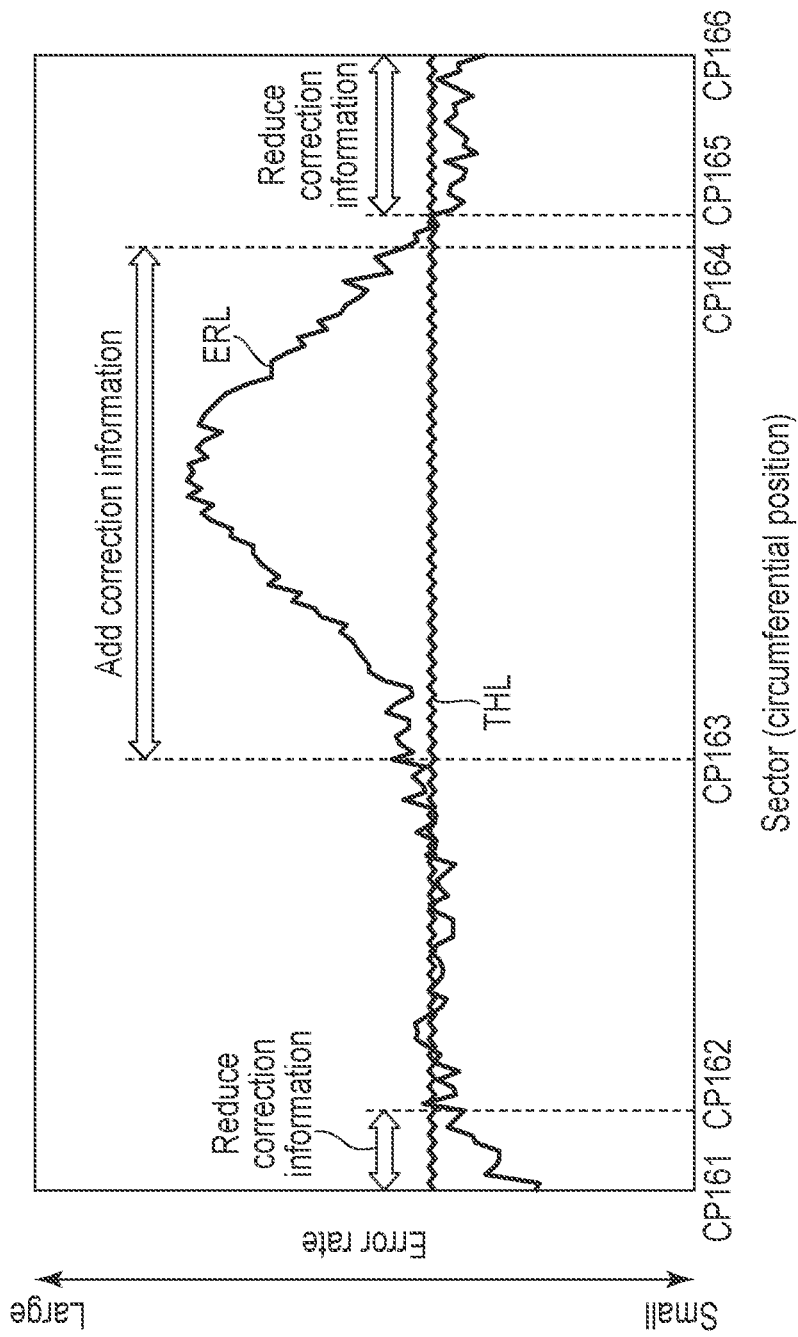
F I G. 16

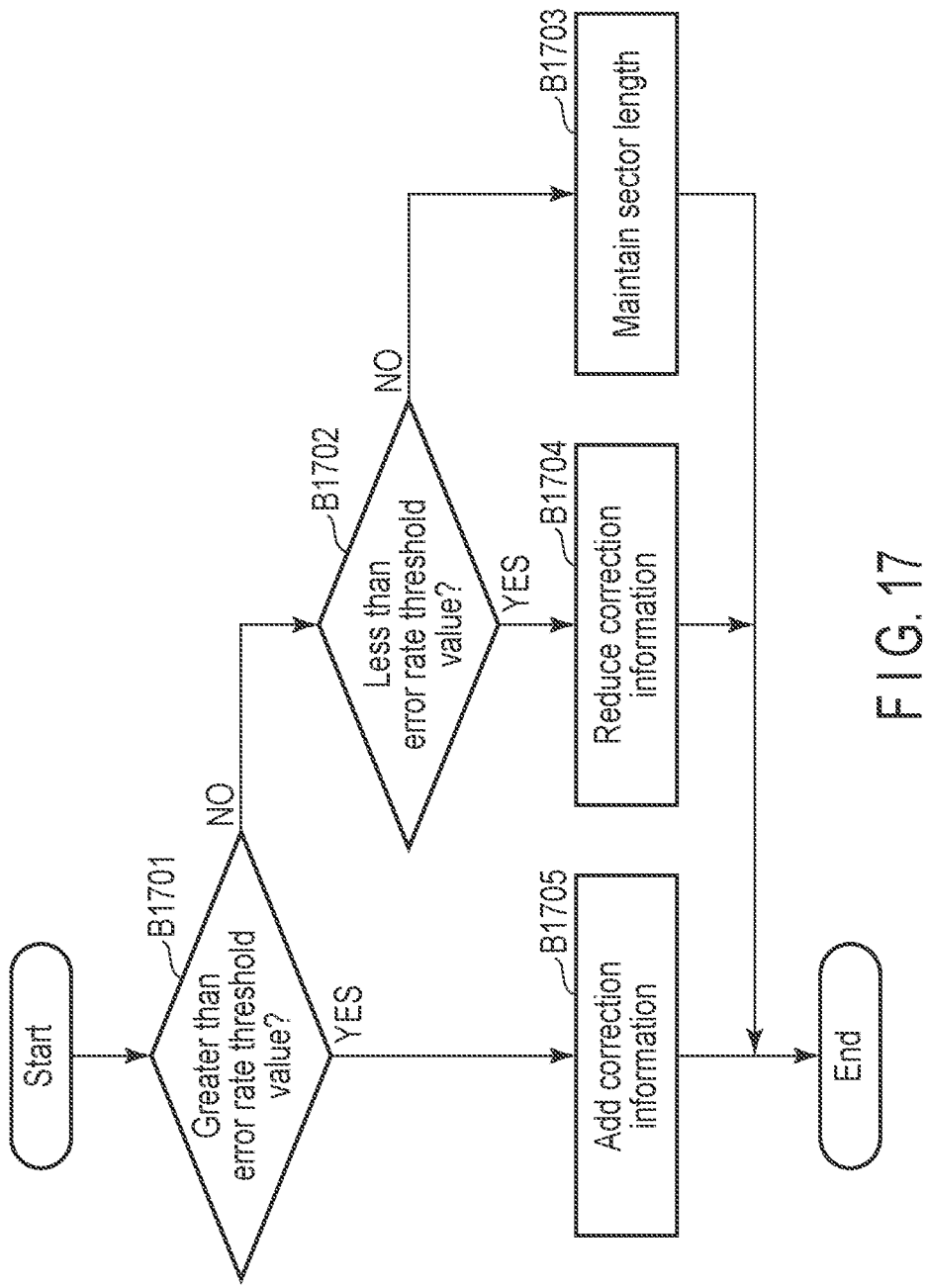
F I G. 17

MAGNETIC DISK DEVICE AND SECTOR PROCESSING METHOD

CROSS-REFERENCE TO RELATED APPLICATIONS

This application is based upon and claims the benefit of priority from Japanese Patent Application No. 2020-142712, filed Aug. 26, 2020, the entire contents of which are incorporated herein by reference.

FIELD

Embodiments described herein relate generally to a magnetic disk device and a sector processing method.

BACKGROUND

A magnetic disk device performs a defect inspection including a defect such as a scratch on the disk. The magnetic disk device detects the defect on the disk by the defect inspection. The magnetic disk device does not use the sector including the detected defect in the read/write process. Therefore, as the defects increase, the read/write processing performance and format efficiency may decrease.

In addition, in the magnetic disk device, the amount of data of information for correcting an unreadable sector (hereinafter, may be referred to as correction information) is constant in each sector of the disk, so that when the read/write characteristics of the disk differ within the disk due to a surface unevenness (or a recording layer unevenness of the disk), etc., the defective rate of the disk can increase as the region with the poor read/write characteristics of the disk increases. That is, the yield of the disk may decrease as the number of regions where the read/write characteristics of the disk is not good increases.

BRIEF DESCRIPTION OF THE DRAWINGS

FIG. 1 is a block diagram showing a configuration of a magnetic disk device according to a first embodiment.

FIG. 6 is a schematic diagram showing an example of a track adjustment method when the sector adjustment process is performed on the defect sector.

FIG. 11 is a schematic view showing an example of a read stop process according to a modification 2.

FIG. 13 is a block diagram showing an example of a configuration of a magnetic disk device according to a second embodiment.

FIG. 14 is a schematic diagram showing an example of the configuration of a particular sector according to the second embodiment.

FIG. 15 is a schematic diagram showing an example of the configuration of the particular sector according to the second embodiment.

FIG. 16 is a diagram showing an example of an error rate change of each sector of the particular track.

FIG. 17 is a flowchart showing an example of a sector adjustment method according to the second embodiment.

DETAILED DESCRIPTION

Figure 2:
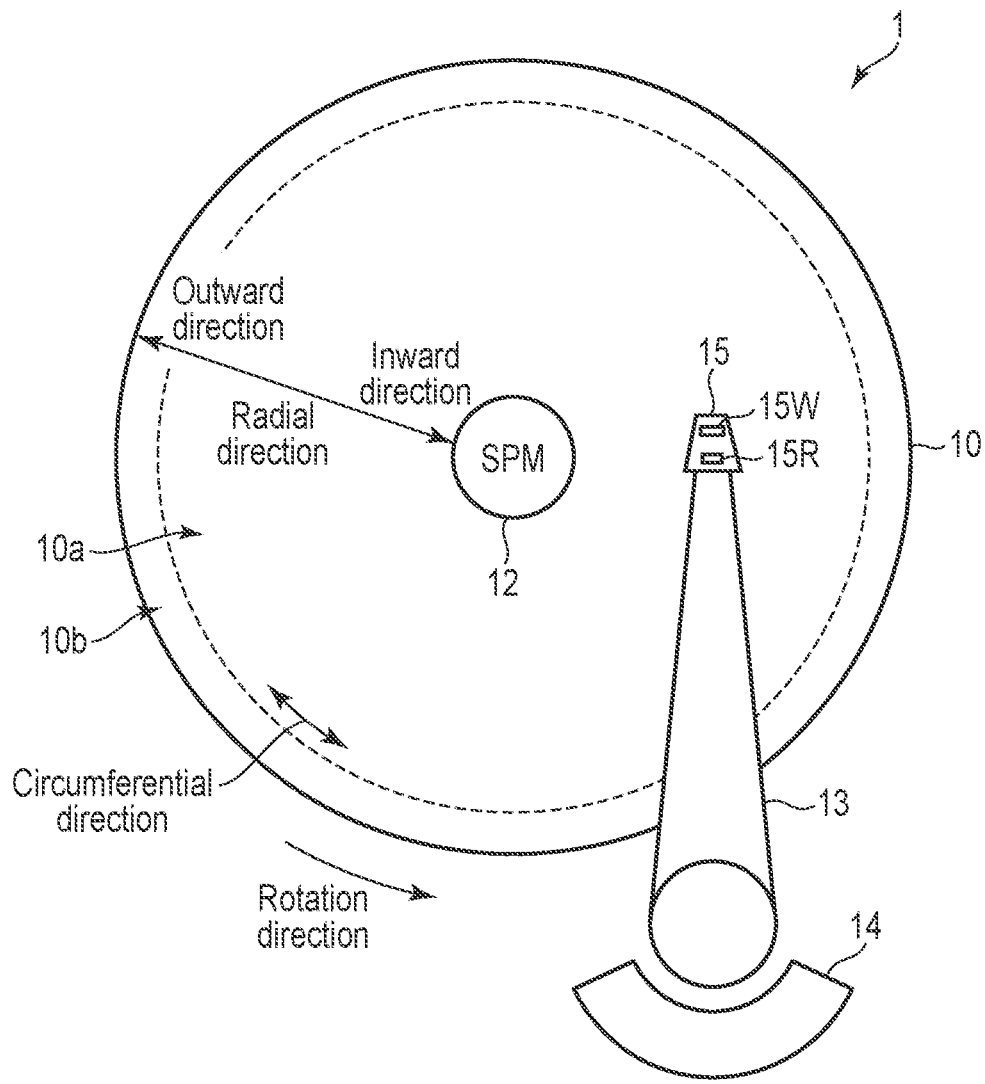
FIG. 2 is a schematic view showing an example of the arrangement of the head with respect to the disk according to the first embodiment.

In general, according to one embodiment, a magnetic disk device comprises: a disk having a first sector including first servo data, first user data, and first correction information used to correct a data error; a head that writes data to the disk and that reads data from the disk; and a controller that changes, according to a first defect length of a defect generated in the first sector in a circumferential direction of the disk, a first sector length of the first sector in the circumferential direction.

Hereinafter, embodiments will be described with reference to the drawings. It should be noted that the drawings are merely examples and do not limit the scope of the invention.

First Embodiment

FIG. 1 is a block diagram showing an example of a configuration of a magnetic disk device 1 according to a first embodiment.

The magnetic disk device 1 includes a head disk assembly (HDA), a driver IC 20, a head amplifier integrated circuit (hereinafter referred to as a head amplifier IC or a preamplifier) 30, a volatile memory 70, a nonvolatile memory 80, a buffer memory (buffer) 90, and a system controller 130 which is an integrated circuit of one chip. Further, the magnetic disk device 1 is connected to a host system (hereinafter may be simply referred to as a host) 100.

The HDA includes a magnetic disk (hereinafter referred to as a disk) 10, a spindle motor (hereinafter referred to as an SPM) 12, an arm 13 on which a head 15 is mounted, a voice coil motor (hereinafter referred to as a VCM) 14. The disk 10 is attached to the SPM 12 and is rotated by the drive of the SPM 12. The arm 13 and the VCM 14 constitute an actuator. The actuator controls the movement of the head 15 mounted on the arm 13 to a particular position of the disk 10 by driving the VCM 14. The two or more disks 10 and the two or more the heads 15 may be provided.

In the disk 10, a user data region 10a that can be used by a user in a region in which the data can be written, and a system region 10b in which information necessary for the system management is written are allocated. Hereinafter, the direction from the inner circumference to the outer circumference of the disk 10 or the direction from the outer circumference to the inner circumference of the disk 10 is referred to as a radial direction. In the radial direction, the direction from the inner circumference to the outer circumference is referred to as the outward direction (outside), and the direction from the outer circumference to the inner circumference is referred to as the inward direction (inside). A direction that intersects, for example, is orthogonal to the radial direction of the disk 10 is referred to as a circumferential direction. That is, the circumferential direction corresponds to the direction along the circumference of the disk 10. Further, a particular position of the disk 10 in the radial direction may be referred to as a radial position, and a particular position of the disk 10 in the circumferential direction may be referred to as a circumferential position. The radial position and the circumferential position may be collectively referred to as a position. The disk 10 is divided into a plurality of regions (hereinafter, may be referred to as zones) for each particular range in the radial direction. The zone includes a plurality of tracks. For example, a zone corresponds to a region where a particular number of tracks can be written, or a region where a particular amount of data can be written. The track includes a plurality of sectors. The "track" has various meanings such as one region of a plurality of radially divided regions of the disk 10, a path of the head 15 at a particular radial position, data extending in the circumferential direction of the disk 10, data for one lap of data written to a track at a particular radial position, data written to a particular track of the disk 10, part of data written to a particular track of the disk 10, and the like. The "sector" has various meanings such as one region of a plurality of regions obtained by dividing a particular track of the disk 10 in the circumferential direction, data written to a circumferential position at the particular radial position of the disk 10, data written to a particular sector of a particular track of the disk 10, and the like. The "radial width of the track" may be referred to as a "track width". The "radial width of a sector" may be referred to as a "sector width". A path that passes through the center position of the track width in a particular track is referred to as a "track center".

The head 15 has a slider as a main body, and has a write head 15W and a read head 15R mounted on the slider. The write head 15W writes data on the disk 10. The read head 15R reads data recorded on a track on the disk 10. In addition, the "write head 15W" may be simply referred to as a "head 15", the "read head 15R" may be simply referred to as the "head 15", and the write head 15W and the read head 15R may be collectively referred to as the head 15. The "center of the head 15" may be simply referred to as the "head 15", the "center of the write head 15W" may be simply referred to as the "write head 15W" or "head 15", and the "center of the read head 15R" may be simply referred to as the "read head 15R" or the "head 15". "Positioning the center of the head 15 to the track center of a particular track" may be expressed as "positioning the head 15 to a particular track", "disposing the head 15 on a particular track", "locating the head 15 on a particular track" or the like.

FIG. 2 is a schematic view showing an example of the arrangement of the head 15 with respect to the disk 10 according to the present embodiment. As shown in FIG. 2, the direction in which the disk 10 rotates in the circumferential direction is referred to as the rotation direction. In the example shown in FIG. 2, the rotation direction is shown counterclockwise, but it may be in the opposite direction (clockwise).

In the example shown in FIG. 2, the disk 10 includes the user data region 10a and the system region 10b. In FIG. 2, the user data region 10a and the system region 10b are disposed in the order described in the outward direction. In FIG. 2, the system region 10b is disposed adjacent to the user data region 10a in the outward direction. Here, "adjacent" includes not only a state in which data, an object, a region, a space, etc., are disposed in contact with each other, but also a state in which they are disposed at a particular interval.

As shown in FIG. 2, the head 15 is disposed at a particular position so that the actuator rotates around the rotation axis and moves from the inward direction to the outward direction by driving the VCM 14 with respect to the disk 10. Further, the head 15 is disposed at a particular position so that the actuator rotates around the rotation axis and moves from the outward direction to the inward direction by driving the VCM 14 with respect to the disk 10.

Figure 3:
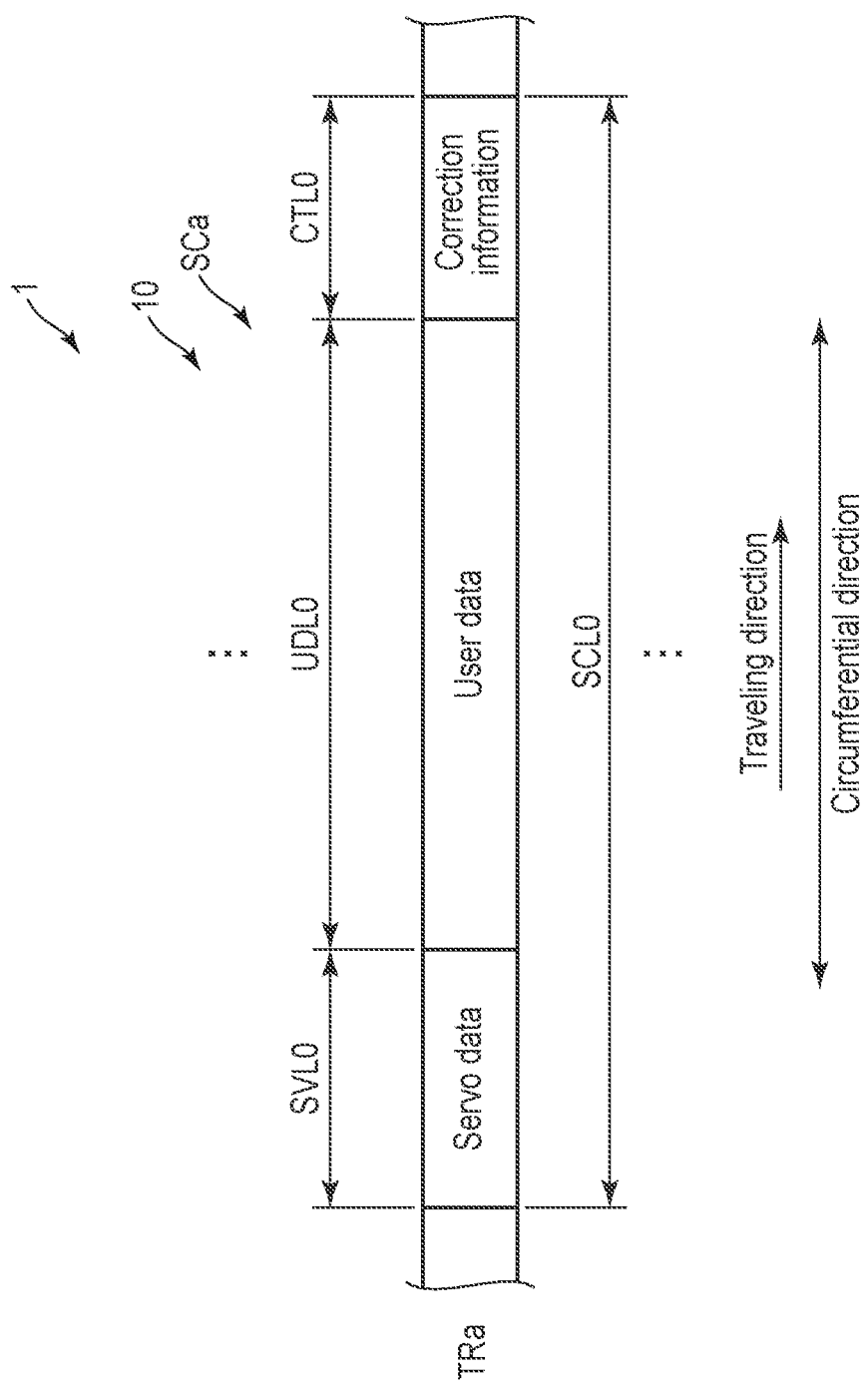
FIG. 3 is a schematic diagram showing an example of the configuration of a particular sector according to the first embodiment.

FIG. 3 is a schematic diagram showing an example of the configuration of a particular sector SCa according to the present embodiment. FIG. 3 shows a particular sector SCa written to a particular track TRa of the disk 10. As shown in FIG. 3, the direction in which data is written and read in the circumferential direction is referred to as a traveling direction. For example, the traveling direction is opposite to the rotation direction of the disk 10. The traveling direction may be the same as the rotation direction of the disk 10. In FIG. 3, for convenience of explanation, each track TRa is shown in a band shape extending in the circumferential direction with a constant track width, but practically, it is curved along the circumferential direction.

In FIG. 3, the sector SCa includes servo data (or a servo sector), user data, and correction information. Note that the sector SCa may include data other than the servo data, the user data, and the correction information. In FIG. 3, in the sector SCa, the servo data, the user data, and the correction information are disposed in the traveling direction in the order of description. In other words, in the sector SCa, the user data is disposed in the traveling direction of the servo data, and the correction information is disposed in the traveling direction of the user data. The servo data, the user data, and the correction information may be disposed differently from the example shown in FIG. 3. In FIG. 3, the circumferential length (or may be referred to as a period) SCL0 of the sector SCa corresponds to the sum of a servo data length SVL0, a user data length UDL0, and a correction information length CTL0. Hereinafter, the "length of the track in the circumferential direction" may be referred to as the "length of the track or track length", the "the length of the sector in the circumferential direction" may be referred to as the "the length of the sector or sector length", the "circumferential length of servo data" may be referred to as the "length of the servo data or servo data length", the "circumferential length of user data" may be referred to as the "length of the user data or user data length", and the "circumferential length of the correction information" may be referred to as the "length of the correction information or correction information length". Each sector of disk 10 can be set to the same sector length SCL0 by initial setting, for example. Terms such as "same", "identical", "match", and "equivalent" include not only the meaning of being exactly the same, but also the meaning of being different to the extent that they can be regarded as substantially the same. Hereinafter, the "sector length which is a reference of each sector of the disk 10 and that can be set as a sector length of each sector of the disk 10 by initial setting or the like" may be referred to as a "reference sector length". The sector length of a particular sector may correspond to the amount of data that can be written to this sector (hereinafter, may be simply referred to as the capacity of the sector). In FIG. 3, the sector length SCL0 corresponds to the reference sector length.

The servo data includes, for example, a preamble, a servo mark, a gray code, a PAD, burst data, and a post code. The servo data may not include the post code. In the servo data, the preamble, the servo mark, the gray code, the PAD, the burst data, and the post code are consecutively disposed from the front to the back in the circumferential direction in this order. The preamble includes preamble information for synchronizing with a reproduction signal of a servo pattern composed of the servo mark, the gray code, and the like. The servo mark includes servo mark information indicating the start of the servo pattern. The gray code is composed of the address of a particular track (cylinder address) and the address of the servo sector of the particular track. Burst data is data (relative position data) used to detect a position shift (positional error) of the head 15 in the radial direction and/or the circumferential direction with respect to the track center of a particular track, and configured by a repeating pattern with a particular period. Burst data includes, for example, N Burst and Q Burst. The N burst and the Q burst are written with a data pattern whose phases are shifted 90° with each other in the radial direction of the disk 10. The PAD includes PAD information for synchronization signals such as a gap and a servo AGC. The post code includes data and the like for correcting an error caused by track distortion with respect to a target path, of the head 15, disposed concentrically with the disk 10, for example, the track center which is caused by blurring (repeated runout: RRO) synchronized with the rotation of the disk 10 when the servo data is written to the disk.

User data corresponds to data available to the user. The correction information corresponds to the information for correcting the data having a fault or an error. In other words, the correction information corresponds to the information used to correct (or error correct) unreadable data or sectors. The correction information includes, for example, parity, an error correction code (ECC), and the like.

The driver IC 20 controls the driving of the SPM 12 and the VCM 14 according to the control of the system controller 130 (more specifically, the MPU 50 described later).

The head amplifier IC (preamplifier) 30 includes a read amplifier and a write driver. The read amplifier amplifies the read signal read from the disk 10 to output it to the system controller 130 (more specifically, a read/write (R/W) channel 60 to be described later). The write driver outputs a write current corresponding to the signal output from the R/W channel 60 to the head 15.

The volatile memory 70 is a semiconductor memory from which stored data is lost when power supply is cut off. The volatile memory 70 stores data and the like necessary for processing in each part of the magnetic disk device 1. The volatile memory 70 is, for example, a dynamic random access memory (DRAM) or a synchronous dynamic random access memory (SDRAM).

The nonvolatile memory 80 is a semiconductor memory that records data stored even when power supply is cut off. The nonvolatile memory 80 is, for example, a NOR type or NAND type flash read only memory (FROM).

The buffer memory 90 is a semiconductor memory that temporarily records data and the like transmitted and received between the magnetic disk device 1 and a host 100. It is to be noted that the buffer memory 90 may be formed integrally with the volatile memory 70. The buffer memory 90 is, for example, a DRAM, a static random access memory (SRAM), an SDRAM, a ferroelectric random access memory (FeRAM), a magnetoresistive random access memory (MRAM), or the like.

The system controller (controller) 130 is implemented by using a large scale integrated circuit (LSI) referred to as the System-on-a-Chip (SoC) in which a plurality of elements is integrated on a single chip, for example. The system controller 130 includes a hard disk controller (HDC) 40, a microprocessor (MPU) 50, and the read/write (R/W) channel 60. The system controller 130 is electrically connected to the driver IC 20, the head amplifier IC 30, the volatile memory 70, the nonvolatile memory 80, the buffer memory 90, and the host 100, for example.

The HDC 40 controls data transfer between the host 100 and the R/W channel 60 in response to an instruction from the MPU 50 described later. The HDC 40 is electrically connected to, for example, the volatile memory 70, the nonvolatile memory 80, the buffer memory 90, and the like.

The MPU 50 is a main controller that controls each part of the magnetic disk device 1. The MPU 50 controls the VCM 14 via the driver IC 20 and executes servo control for positioning the head 15. The MPU 50 also controls the SPM 12 via the driver IC 20 to rotate the disk 10. The MPU 50 controls a write operation of the data to the disk 10 and selects the storage destination of the write data. Further, the MPU 50 controls the read operation of the data from the disk 10 and also controls the process of the data (hereinafter, may be referred to as read data) read from the disk 10. The MPU 50 is connected to each part of the magnetic disk device 1. The MPU 50 is electrically connected to the driver IC 20, the HDC 40, the R/W channel 60, and the like, for example.

The R/W channel 60 responds to an instruction from the MPU 50, performs the signal process of the read data transferred from the disk 10 to the host 100 and the data transferred from the host 100 or the like to the disk 10 (hereinafter, may be referred to as write data). The R/W channel 60 has a circuit or a function of modulating write data. The R/W channel 60 has a circuit or a function for modulating read data. The R/W channel 60 has a circuit or a function for measuring a signal quality of read data. The R/W channel 60 has a circuit or a function of inspecting and detecting a defect including a defect such as a scratch. Further, the R/W channel 60 has a circuit or a function of changing the sector length of a particular sector, for example, the length of servo data, the length of user data, and the length of correction information. The R/W channel 60 is electrically connected to, for example, the head amplifier IC 30, the HDC 40, the MPU 50, the volatile memory 70, the nonvolatile memory 80, the buffer memory 90, and the like. The circuit and function of the R/W channel 60 described above may be mounted on the HDC 40 or the MPU 50.

The R/W channel 60 has a detection unit 610 and an adjustment unit 620. The R/W channel 60 may include each unit, for example, the detection unit 610, the adjustment unit 620, and the like as a circuit. In the R/W channel 60, each unit, for example, the detection unit 610 and the adjustment unit 620, may be performed on the firmware by the MPU 50. Further, the detection unit 610, the adjustment unit 620 and the like may be provided in the HDC 40 or the MPU 50.

The detection unit 610 executes a defect inspection (hereinafter, may be referred to as a defect inspection) on the disk 10 to detect the defect of the disk 10 in the defect inspection. The detection unit 610 registers (or records) information (hereinafter, may be referred to as defect information) such as the position of the defect (hereinafter, may be referred to as a defect position or a fault position) in the disk 10 detected by the defect inspection and the length of the defect (hereinafter, may be referred to as a defect length or a fault length) in a defect map. For example, the detection unit 610 executes a defect inspection in a test at the time of manufacturing, and registers the detected defect information in the defect map. The detection unit 610 may record the defect map in a particular recording area, for example, the system region 10*b* of the disk 10, the volatile memory 70, the nonvolatile memory 80, the buffer memory 90, or the like.

The adjustment unit 620 adjusts (or changes) a region having a defect (hereinafter, may be referred to as a defect region or simply a defect), for example, a sector having a defect (hereinafter, may be referred to as a defect sector). Hereinafter, adjusting or changing may be referred to as an "adjustment process" or a "change process". Further, adjusting or changing a sector, for example, the sector length of a sector, may be referred to as a "sector adjustment process" or a "sector change process". The adjustment unit 620 adjusts (or changes) the length of the defect, for example, the sector length of the defect sector, by referring to the defect information registered in the defect map. The adjustment unit 620 adjusts (or changes) the sector length of the defect sector based on the position of the defect and the length of the defect in the circumferential direction (hereinafter, may be referred to as the length of the defect). The adjustment unit 620 adjusts (or changes) the sector length of the defect sector by adding particular information, for example, correction information to the defect sector according to the length of the defect. In other words, the adjustment unit 620 extends the length of the correction information of the defect sector by adding particular information, such as correction information, to the defect sector according to the length of the defect to extend the sector length of the defect sector, compared with the reference sector length. Hereinafter, the information added in the sector adjustment process or the sector change process may be referred to as additional information, and the correction information added in the sector adjustment process or the sector change process may be referred to as additional correction information. The adjustment unit 620 may include a circuit for identifying the position of the defect (hereinafter, may be referred to as a defect position identification circuit).

The adjustment unit 620, determines, according to a track including a defect sector on which the sector adjustment process (or sector change process) is performed (hereinafter, may be referred to as an adjustment target track), whether to execute the sector adjustment process (or sector change process) or not to execute the sector adjustment process (or sector change process) on the defect sector of the adjustment target track. When it is determined that the sector adjustment process is performed on the defect sector of the adjustment target track, the adjustment unit 620 adjusts the adjustment target track. When it is determined that the sector adjustment process is not performed on the defect sector of the adjustment target track, the adjustment unit 620 does not adjust the adjustment target track.

The adjustment unit 620 determines, according to the capacity of the data (hereinafter, may be referred to as the capacity of a remaining sector or the capacity of a remaining region) that can be written in the remaining region (hereinafter, may be referred to as a remaining sector or a remaining region) of the adjustment target track, for example, the circumferential length (hereinafter, may be referred to as the length of a remaining sector, a remaining sector length, the length of a remaining region, or a remaining region length) of the remaining sector (or remaining region), whether to perform the sector adjustment process (or sector change process) or not to perform the sector adjustment process (or sector change process) on the defect sector of the target track. The remaining sector is, for example, a remaining (residual) region when a track having a particular track length is divided by a sector having the reference sector length. The remaining sector is, for example, a remaining (residual) region when a track having a particular track length (hereinafter, may be referred to as a reference track length) which serves as a reference set in the initial setting or the like is divided by a sector having the reference sector length. In this case, the remaining sector is, for example, a sector length less than the reference sector length. The remaining sectors can be disposed in the traveling direction adjacent to a plurality of sectors consecutively disposed side by side in the traveling direction from, for example, a sector (hereinafter, may be referred to as a start sector) located at the start position of a particular track to a sector (hereinafter, may be referred to as a last sector) located at the end position of this track. In other words, the remaining sector may be placed adjacent to the last sector of the particular track in the traveling direction. The remaining sector may be, for example, a sector having a reference sector length or more. Further, the remaining sector may be, for example, a region remaining after subtracting a length obtained by multiplying the sector having a reference sector length by the number set in the initial setting or the like from the track having the reference track length set in the initial setting or the like.

The adjustment unit 620 determines whether the capacity of the remaining sector of the adjustment target track including the defect sector, for example, the length of the remaining sector of the adjustment target track is equal to or greater than the length of additional information added to the defect sector in the sector adjustment process, for example, the length of the additional correction information, or less than the length of the additional information. The adjustment unit 620 may determine whether the capacity of the remaining sector of the adjustment target track, for example, the length of the remaining sector of the adjustment target track is equal to or greater than the length of the defect of the adjustment target track, or the length of the remaining sector is less than the length of this defect.

When it is determined that the length of the remaining sector of the adjustment target track is equal to or greater than the length of the additional information to be added to the defect sector of the adjustment target track, for example, the length of the additional correction information, the adjustment unit 620 adds this additional information, for example, additional correction information, to the defect sector of the adjustment target track, and redisposes (or resets) a plurality of sectors that is consecutively disposed side by side in the traveling direction of the defect sector by shifting it in the traveling direction by the length of the additional information, for example, the length of the additional correction information. When it is determined that the length of the remaining sector of the adjustment target track is equal to or greater than the length of the defect of the defect sector of the adjustment target track, the adjustment unit 620 adds this additional information, for example, additional correction information, to the defect sector of the adjustment target track, and redisposes (or resets) a plurality of sectors that is consecutively disposed side by side in the traveling direction of the defect sector by shifting it in the traveling direction by the length of the additional information, for example, the length of the additional correction information.

When it is determined that the length of the remaining sector of the adjustment target track is less than the length of the additional information to be added to the defect sector of the adjustment target track, for example, the length of the additional correction information, the adjustment unit 620 does not execute the sector adjustment process on the defect sector of the adjustment target track. When it is determined that the length of the remaining sector of the adjustment target track is less than the length of the defect of the defect sector of the adjustment target track, the adjustment unit 620 does not execute the sector adjustment process on the defect sector of the adjustment target track. When the sector adjustment process is not performed on the defect sector of this adjustment target track, the adjustment unit 620 may register the defect sector as a sector (hereinafter, may be referred to as a bad sector) that is not read (or cannot be read) or is not used (or cannot be used) in a particular table, etc., for example, in a P list (primary list) in which the sector including a defect such as a scratch detected by a pre-shipment inspection is registered, or in a G list (grown list), etc., in which the sector including a defect detected by a post-shipment inspection is registered. For example, a logical block address (LBA) is not allocated to the bad sector. The adjustment unit 620 does not use a bad sector registered in a particular table or the like (for example, the P list, the G list, etc.) in the read/write process.

When the adjustment unit 620 executes a sector adjustment process (or sector change process) on the defect sector of the adjustment target track, the adjustment unit 620 adjusts the length of the adjustment target track. When reading/writing an adjustment target track whose track length was adjusted, the adjustment unit 620 adjusts the transfer speed.

For example, when the adjustment unit 620 adds correction information to the defect sector of the adjustment target track and extends the length of this defect sector, compared with the reference sector length, the adjustment unit 620 extends the length of this adjustment target track according to the length of the added correction information. When reading/writing the adjustment target track with an extended track length, the adjustment unit 620 raises (increases) the transfer speed.

When the adjustment unit 620 executes the sector adjustment process (or sector change process) on the defect sector of the adjustment target track, the adjustment unit 620 adjusts this adjustment target track or a plurality of tracks including this adjustment target track according to the remaining sector of this adjustment target track.

For example, the adjustment unit 620 determines whether the length of the remaining sector of the adjustment target track including the defect sector is equal to or greater than the length of additional information added to the defect sector in the sector adjustment process, for example, the length of the additional correction information, or less than the length of the additional information. When it is determined that the length of the remaining sector of the adjustment target track is equal to or greater than the length of the additional information to be added to the defect sector of the adjustment target track, for example, the length of the additional correction information, the adjustment unit 620 adds this additional information, for example, additional correction information, to the defect sector of the adjustment target track, and redisposes (or resets) a plurality of sectors that is consecutively disposed side by side in the traveling direction of the defect sector by shifting it in the traveling direction by the length of the additional information, for example, the length of the additional correction information. When it is determined that the length of the remaining sector of the adjustment target track is less than the length of the additional information to be added to the defect sector of the adjustment target track, for example, the length of the additional correction information, the adjustment unit 620 adds this additional information, for example, additional correction information, to the defect sector of the adjustment target track, shifts a plurality of sectors consecutively disposed side by side in the traveling direction of this defect sector in the traveling direction by the length of this additional information, for example, the length of the additional correction information, disposes part of the last sector of this adjustment target track at the remaining sector of this adjustment target track, and disposes part of the remaining last sector that cannot be written to this adjustment target track at a track (hereinafter, may be referred to as an adjacent track) adjacent to this adjustment target track. In other words, when it is determined that the length of the remaining sector of the adjustment target track is less than the length of the additional information to be added to the defect sector of the adjustment target track, for example, the length of the additional correction information, the adjustment unit 620 adds this additional information, for example, the additional correction information, to the defect sector of the adjustment target track, shifts a plurality of sectors consecutively disposed side by side in the traveling direction of this defect sector in the traveling direction by the length of this additional information, for example, the length of the additional correction information, and disposes the last sector of the adjustment target track from this adjustment target track to the adjacent track of the adjustment target track.

Figure 4:
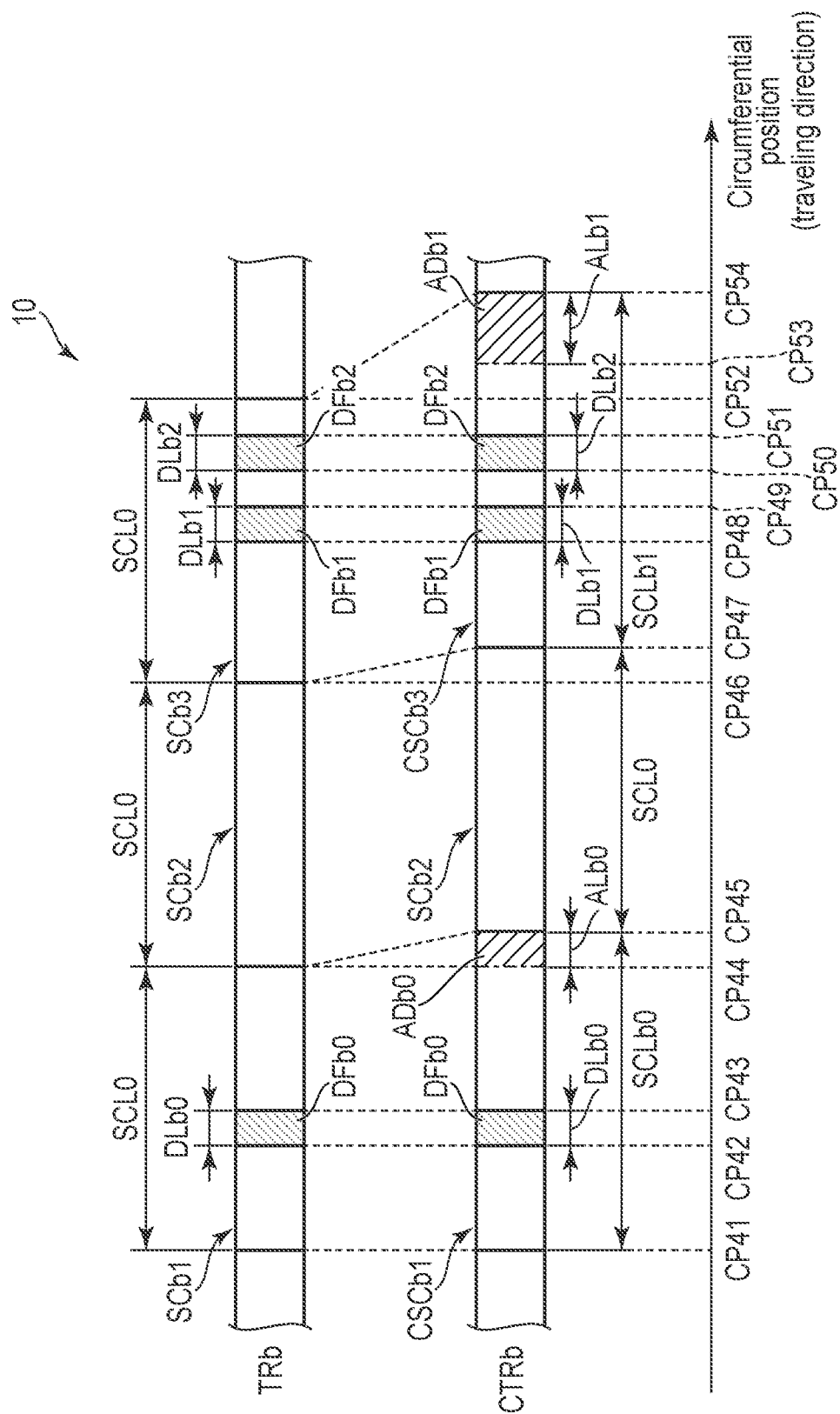
FIG. 4 is a schematic diagram showing an example of a sector adjustment processing method of a defect sector according to the first embodiment.

FIG. 4 is a schematic diagram showing an example of a sector adjustment processing method of the defect sectors SCb1 and SCb3 according to the present embodiment. FIG. 4 shows a track (adjustment target track) TRb and a track CTRb. In FIG. 4, the horizontal axis corresponds to the circumferential position. In FIG. 4, it goes in the traveling direction as it goes toward the tip of the arrow. The horizontal axis of FIG. 4 shows the circumferential positions CP41, CP42, CP43, CP44, CP45, CP46, CP47, CP48, CP49, CP50, CP51, CP52, CP53, and CP54. In FIG. 4, the circumferential positions CP41, CP42, CP43, CP44, CP45, CP46, CP47, CP48, CP49, CP50, CP51, CP52, CP53, and CP54 are positions disposed in the order of description along the traveling direction. The circumferential position CP42 is the circumferential position in the traveling direction of the circumferential position CP41, the circumferential position CP43 is the circumferential position in the traveling direction of the circumferential position CP42, the circumferential position CP44 is the circumferential position in the traveling direction of the circumferential position CP43, the circumferential position CP45 is the circumferential position in the traveling direction of the circumferential position CP44, and the circumferential position CP46 is the circumferential position in the traveling direction of the circumferential position CP45. The circumferential position CP47 is the circumferential position in the traveling direction of the circumferential position CP46, the circumferential position CP48 is the circumferential position in the traveling direction of the circumferential position CP47, the circumferential position CP49 is the circumferential position in the traveling direction of the circumferential position CP48, the circumferential position CP50 is the circumferential position in the traveling direction of the circumferential position CP49, the circumferential position CP51 is the circumferential position in the traveling direction of the circumferential position CP50, the circumferential position CP52 is the circumferential position in the traveling direction of the circumferential position CP51, the circumferential position CP53 is the circumferential position in the traveling direction of the circumferential position CP52, and the circumferential position CP54 is the circumferential position in the traveling direction of the circumferential position CP53.

In the example shown in FIG. 4, the track TRb includes a defect sector SCb1, a sector SCb2, and a defect sector SCb3. In the track TRb, the defect sector SCb1, the sector SCb2, and the defect sector SCb3 are consecutively disposed side by side in the order described in the traveling direction. The defect sector SCb1 includes a defect DFb0. The defect sector SCb3 includes defects DFb1 and DFb2. In FIG. 4, the defect sector SCb1, the sector SCb2, and the defect sector SCb3 have the reference sector length SCL0. The defect sector SCb1 is disposed from the circumferential position CP41 to the circumferential position CP44. That is, the sector length SCL0 of the defect sector SCb1 corresponds to the length in the circumferential direction from the circumferential position CP41 to the circumferential position CP44. The defect DFb0 is disposed in the defect sector SCb1 from the circumferential position CP42 to the circumferential position CP43. That is, the length DLb0 of the defect DFb0 corresponds to the length in the circumferential direction from the circumferential position CP42 to the circumferential position CP43. The sector SCb2 is disposed from the circumferential position CP44 to the circumferential position CP46. That is, the sector length SCL0 of the sector SCb2 corresponds to the length in the circumferential direction from the circumferential position CP44 to the circumferential position CP46. The defect sector SCb3 is disposed from the circumferential position CP46 to the circumferential position CP52. That is, the sector length SCL0 of the defect sector SCb3 corresponds to the length in the circumferential direction from the circumferential position CP46 to the circumferential position CP52. The defect DFb1 is disposed in the defect sector SCb3 from the circumferential position CP48 to the circumferential position CP49. That is, the length DLb1 of the defect DFb1 corresponds to the length in the circumferential direction from the circumferential position CP48 to the circumferential position CP49. The defect DFb2 is disposed in the defect sector SCb3 from the circumferential position CP50 to the circumferential position CP51. That is, the length DLb2 of the defect DFb2 corresponds to the length in the circumferential direction from the circumferential position CP50 to the circumferential position CP51.

In the example shown in FIG. 4, a track CTRb includes the defect sector CSCb1, the sector SCb2, and a defect sector CSCb3. In the track CTRb, the defect sector CSCb1, the sector SCb2, and the defect sector CSCb3 are consecutively disposed side by side in the order described in the traveling direction. The defect sector CSCb1 corresponds to the defect sector SCb1 after the adjustment process (or change process) is performed (hereinafter, may be referred to as after the adjustment process or after the change process). That is, the defect sector SCb1 corresponds to the defect sector CSCb1 before the adjustment process (or change process) is performed (hereinafter, may be referred to as before the adjustment process or before the change process). The defect sector CSCb1 includes the defect DFb0 and additional information, for example, additional correction information ADb0. The defect sector CSCb3 corresponds to the defect sector SCb3 after the adjustment process (or change process). That is, the defect sector SCb3 corresponds to the defect sector CSCb3 before the adjustment process (or change process). The defect sector CSCb3 includes the defects DFb1 and DFb2 and additional information, for example, additional correction information ADb1. In FIG. 4, the defect sector CSCb1 has a sector length SCLb0. The sector length SCLb0 is longer than the reference sector length SCL0. In FIG. 4, the length ALb0 of additional information ADb0 is the same as the length DLb0 of the defect DFb0. The length ALb0 of the additional information ADb0 may be different from the length DLb0 of the defect DFb0. In FIG. 4, the defect sector CSCb3 has a sector length SCLb1. The sector length SCLb1 is longer than the reference sector length SCL0. In FIG. 4, the length ALb1 of additional information ADb1 corresponds to the sum of the length DLb1 of the defect DFb1 and the length DLb2 of the defect DFb2. The length ALb1 of the additional information ADb1 may be different from the sum of the length DLb1 of the defect DFb1 and the length DLb2 of the defect DFb2. In FIG. 4, the defect sector CSCb1 is disposed from the circumferential position CP41 to the circumferential position CP45. That is, the sector length SCLb0 of the defect sector SCb1 corresponds to the length in the circumferential direction from the circumferential position CP41 to the circumferential position CP45. The defect DFb0 is disposed in the defect sector SCb1 from the circumferential position CP42 to the circumferential position CP43. That is, the length DLb0 of the defect DFb0 corresponds to the length in the circumferential direction from the circumferential position CP42 to the circumferential position CP43. The additional information ADb0 is disposed in the defect sector SCb1 from the circumferential position CP44 to the circumferential position CP45. That is, the length ALb0 of the additional information ADb0 corresponds to the length in the circumferential direction from the circumferential position CP44 to the circumferential position CP45. The sector SCb2 is disposed from the circumferential position CP45 to the circumferential position CP47. That is, the sector length SCL0 of the sector SCb2 corresponds to the length in the circumferential direction from the circumferential position CP45 to the circumferential position CP47. The defect sector CSCb3 is disposed from the circumferential position CP47 to the circumferential position CP54. That is, the sector length SCLb1 of the defect sector CSCb3 corresponds to the length in the circumferential direction from the circumferential position CP47 to the circumferential position CP54. Additional information ADb1 is disposed in the defect sector CSCb3 from the circumferential position CP53 to the circumferential position CP54. That is, the length ALb1 of the additional information ADb1 corresponds to the length in the circumferential direction from the circumferential position CP53 to the circumferential position CP54.

In the example shown in FIG. 4, the adjustment unit 620 performs a process so as to be adjusted to the defect sector CSCb1 by adding additional information ADb0 having a length ALc0 of the additional information ADb0 according to the length DLb0 of the defect DFb to the defect sector SCb1 in which the defect DFb0 registered in the defect map is located. In other words, the adjustment unit 620 adds the additional information ADb0 having the additional information length ALc0 according to the length of the defect DFb to the defect sector SCb1 where the defect DFb0 registered in the defect map is located, and extends the length SCL0 of the defect sector SCc1 to the length SCLb0 of the defect sector CSCc1. The adjustment unit 620 redisposes (or resets), for example, according to the sector adjustment process of the defect sector SCb1, respective sectors that are consecutively disposed side by side in the traveling direction after the sector SCb2 by shifting it in the traveling direction by the length ALb0 of the additional information ADb0.

In the example shown in FIG. 4, the adjustment unit 620 performs a process so as to be adjusted to the defect sector CSCb3 by adding the additional information ADb1 having the length ALb1 of the additional information ADb1 according to the lengths DLb1 and DLb2 of the defects DFb1 and DFb2 to the defect sector SCb3 where the defect DFb1 and DFb2 registered in the defect map are located. In other words, the adjustment unit 620 adds the additional information ADb1 having the length ALb1 of the additional information ADb1 according to the lengths DLb1 and DLb2 of the defects DFb1 and DFb2 to the defect sector SCb3 where the defects DFb1 and DFb2 registered in the defect map are located, and extends the length SCL0 of the defect sector SCb3 to the length SCLb1 of the defect sector CSCb3. The adjustment unit 620 redisposes (or resets), for example, according to the sector adjustment process of the defect sector SCb3, respective sectors that are consecutively disposed side by side in the traveling direction after the defect sector CSCb3 by shifting it in the traveling direction by the length ALb1 of the additional information ADb1.

Hereinafter, an example of the adjustment method of the adjustment target track when the sector adjustment process is performed on the defect sector of the adjustment target track will be described with reference to FIGS. 5, 6, 7, and 8.

Figure 5:
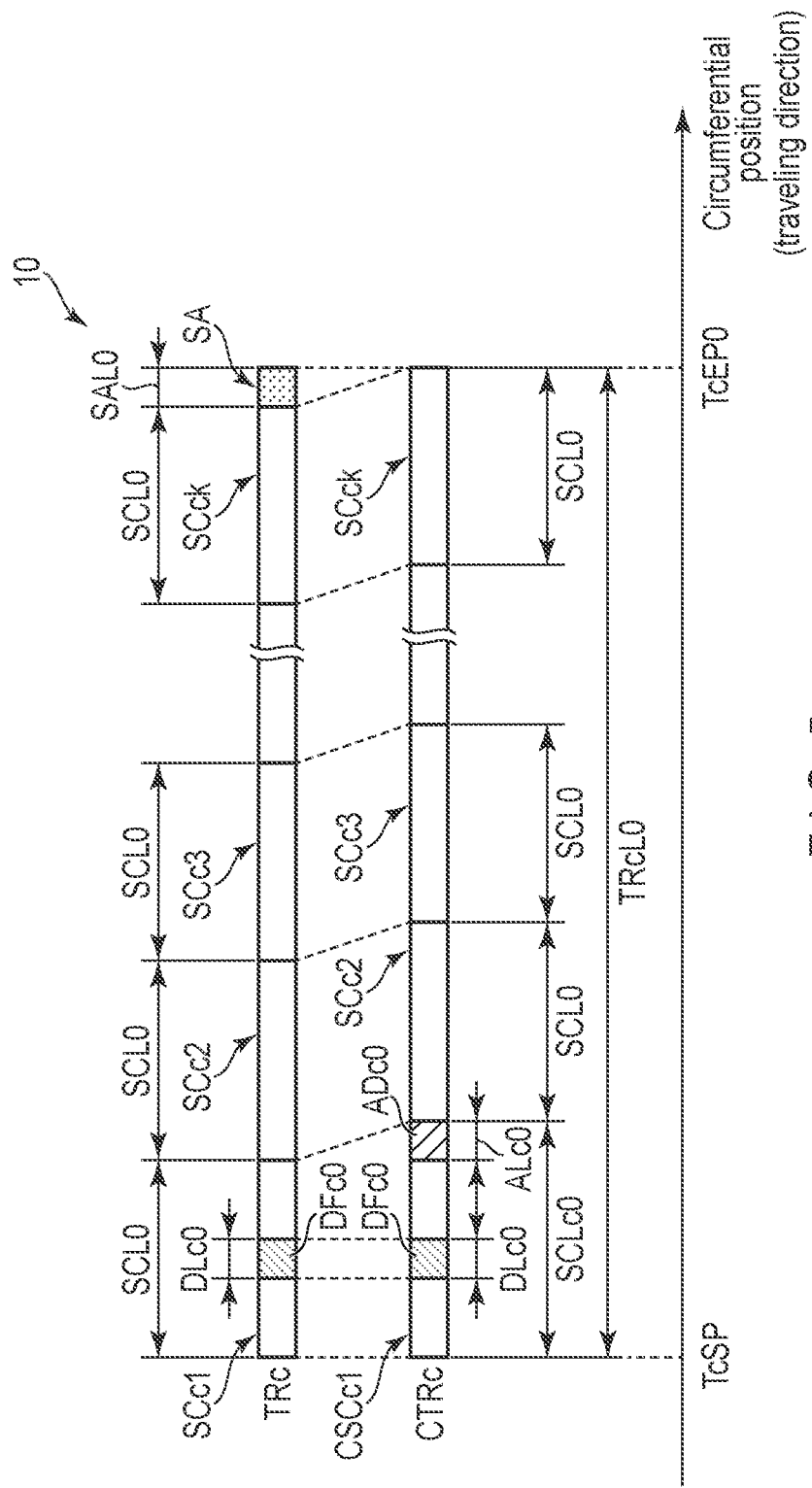
FIG. 5 is a schematic diagram showing an example of a track adjustment method when a sector adjustment process is performed on the defect sector.

FIG. 5 is a schematic diagram showing an example of an adjustment method of a track TRc when the sector adjustment process is performed on the defect sector SCc1. FIG. 5 shows the track TRc and the track CTRc. In FIG. 5, the horizontal axis corresponds to the circumferential position. In FIG. 5, it goes in the traveling direction as it goes toward the tip of the arrow. The horizontal axis of FIG. 5 shows the circumferential position TcSP and the circumferential position TcEP0. In FIG. 5, the circumferential position TcEP0 is a circumferential position located in the traveling direction of the circumferential position TcSP. In the example shown in FIG. 5, the tracks TRc and CTRc are disposed from the circumferential position TcSP to the circumferential position TcEP0. That is, the length TRcL0 of the tracks TRc and CTRc correspond to the lengths in the circumferential direction from the circumferential position TcSP to the circumferential position TcEP0. The length TRcL0 corresponds to, for example, the reference track length. The circumferential position TcSP corresponds to the start position of the tracks TRc and CTRc, and the circumferential position TcEP0 corresponds to the end position of the tracks TRc and CTRc. In FIG. 5, for convenience of explanation, each of the tracks TRc and CTRc is shown in a strip shape extending in the circumferential direction with a constant track width, but practically, they are curved along the circumferential direction. Therefore, the start position TcSP and the end position TcEP0 can match. The start position TcSP and the end position TcEP0 may not match.

In the example shown in FIG. 5, the track TRc includes the defect sector SCc1, the sector SCc2, the sector SCc3, . . . , the sector SCck, and the remaining sector SA. In the track TRc, the defect sector SCc1, the sector SCc2, the sector SCc3, . . . , the sector SCck, and the remaining sector SA are consecutively disposed side by side in the order described in the traveling direction. The defect sector SCc1 includes the defect DFc0. In FIG. 5, the defect sector SCc1, the sector SCc2, the sector SCc3, . . . , and the sector SCck have the reference sector length SCL0. In FIG. 5, the length DLc0 of the defect DFc0 is the same as the length SAL0 of the remaining sector SA. The length DLc0 of the defect DFc0 may be different from the length SAL0 of the remaining sector SA.

In the example shown in FIG. 5, the track CTRc includes the defect sector CSCc1, the sector SCc2, the sector SCc3, . . . , and the sector SCck. In the track CTRc, the defect sector CSCc1, the sector SCc2, the sector SCc3, . . . , and the sector SCck are disposed consecutively side by side in the order described in the traveling direction. The defect sector CSCc1 corresponds to the defect sector SCc1 after the adjustment process (or after the change process). That is, the defect sector SCc1 corresponds to the defect sector CSCc1 before the adjustment process (or before the change process). The defect sector CSCc1 includes the defect DFc0 and additional information such as correction information ADc0. In FIG. 5, the length ALc0 of the additional information ADc0 is the same as the length DLc0 of the defect DFc0. That is, the length ALc0 of the additional information ADc0 is the same as the length SAL0 of the remaining sector SA. The length ALc0 of the additional information ADc0 may be different from the length DLc0 of the defect DFc0. Further, the length ALc0 of the additional information ADc0 may be different from the length SAL0 of the remaining sector SA.

In the example shown in FIG. 5, the adjustment unit 620 determines that the length SAL0 of the remaining sector SA is equal to or greater than the length ALc0 of the additional information ADc0 according to the length DLc0 of the defect DFc0, and performs a process so as to be adjusted (or changed) to the defect sector CSCc1 by adding the additional information ADc0 to the defect sector SCc1. The adjustment unit 620 redisposes (or resets), for example, according to the sector adjustment process of the defect sector SCc1, respective sectors that are consecutively disposed side by side after the sector SCc2 by shifting it in the traveling direction by the length ALc0 of the additional information ADc0. The adjustment unit 620 shifts the sector SCck in the traveling direction by the length ALc0 of the additional information ADc0 and replaces the remaining sector SA with part of the sector SCck.

FIG. 6 is a schematic diagram showing an example of an adjustment method of the track TRc when the sector adjustment process is performed on the defect sectors SCc1 and SCc3. FIG. 6 corresponds to part of FIG. 5.

In the example shown in FIG. 6, the track TRc includes the defect sector SCc1, the sector SCc2, the defect sector SCc3, . . . , the sector SCck, and the remaining sector SA. In the track TRc, the defect sector SCc1, the sector SCc2, the defect sector SCc3, . . . , the sector SCck, and the remaining sector are consecutively disposed side by side in the order described in the traveling direction. The defect sector SCc3 includes the defect DFc1. In FIG. 6, the defect sector SCc1, the sector SCc2, the defect sector SCc3, . . . , and the sector SCck have the reference sector length SCL0. In FIG. 6, the length DLC0 of the defect DFc0 is the same as the length SAL0 of the remaining sector SA. The length DLc0 of the defect DFc0 may be different from the length SAL0 of the remaining sector SA. In FIG. 6, the length DLc1 of the defect DFc1 may be the same as the length SAL0 of the remaining sector SA. Further, the length DLc1 of the defect DFc1 may be different from the length SAL0 of the remaining sector SA.

In the example shown in FIG. 6, the track CTRc includes the defect sector CSCc1, the sector SCc2, the defect sector SCc3, . . . , and the sector SCck. In the track CTRc, the defect sector CSCc1, the sector SCc2, the defect sector SCc3, . . . , and the sector SCck are consecutively disposed side by side in the order described in the traveling direction. The defect sector CSCc3 corresponds to the defect sector SCc3 after the adjustment process (or after the change process). That is, the defect sector SCc3 corresponds to the defect sector CSCc3 before the adjustment process (or before the change process). The defect sector CSCc3 includes the defect DFc1 and additional information, for example, additional correction information ADc1. In FIG. 6, the length ALc1 of the additional information ADc1 is the same as the length DLc1 of the defect DFc1. That is, the length ALc1 of the additional information ADc1 is the same as the length SAL0 of the remaining sector SA. The length ALc1 of the additional information ADc1 is the same as the length ALc0 of the additional information ADc0. The length ALc1 of the additional information ADc1 may be different from the length DLc1 of the defect DFc1. The length ALc1 of the additional information ADc1 may be different from the length SAL0 of the remaining sector SA. Further, the length ALc1 of the additional information ADc1 may be different from the length ALc0 of the additional information ADc0.

In the example shown in FIG. 6, the adjustment unit 620 determines that the length SAL0 of the remaining sector SA is equal to or greater than the length ALc0 of the additional information ADc0 according to the length DLc0 of the defect DFc0, and performs a process so as to be adjusted (or changed) to the defect sector CSCc1 by adding the additional information ADc0 to the defect sector SCc1. The adjustment unit 620, for example, redisposes (or resets) respective sectors that are consecutively disposed side by side after the sector SCc2 by shifting it in the traveling direction by the length ALc0 of the additional information ADc0. The adjustment unit 620 shifts the sector SCck in the traveling direction by the length ALc0 of the additional information ADc0 and replaces the remaining sector SA with part of the sector SCck.

When the sector adjustment process is performed on the defect sector SCc1, the adjustment unit 620 determines that the length of the remaining sector is less than the length of defect DFc1, because there is no remaining sector in the track CTRc, and does not perform the sector adjustment process (or sector change process) on the defect sector SCc3. When the sector adjustment process (or sector change process) is not performed for the defect sector SCc3, the adjustment unit 620 registers the defect sector SCc3 as a bad sector in a particular table, for example, a P list (primary list) or a G list (grown list). The adjustment unit 620 does not use the bad sector SCc3 registered in this table or the like for the read/write process.

In the example shown in FIG. 6, the adjustment unit 620 determines that the length SAL0 of the remaining sector SA is equal to or greater than the length ALc1 of the additional information ADc1 according to the length DLc1 of the defect DFc1, and performs a process so as to be adjusted (or changed) to the defect sector CSCc3 by adding the additional information ADc1 to the defect sector SCc3. The adjustment unit 620, for example, redisposes (or resets) respective sectors that are consecutively disposed side by side after the defect sector SCc3 by shifting it in the traveling direction by the length ALc1 of the additional information ADc1. The adjustment unit 620 shifts the sector SCck in the traveling direction by the length ALc1 of the additional information ADc1 and replaces the remaining sector SA with part of the sector SCck.

When the sector adjustment process is performed on the defect sector SCc3, the adjustment unit 620 determines that the length of the remaining sector is less than the length of defect DFc0, because there is no remaining sector in the track CTRc, and does not perform the sector adjustment process (or sector change process) on the defect sector SCc1. When the sector adjustment process (or sector change process) is not performed for the defect sector SCc1, the adjustment unit 620 registers the defect sector SCc1 as a bad sector in a particular table, for example, a P list (primary list) or a G list (grown list). The adjustment unit 620 does not use the bad sector SCc1 registered in this table or the like for the read/write process.

Figure 7:
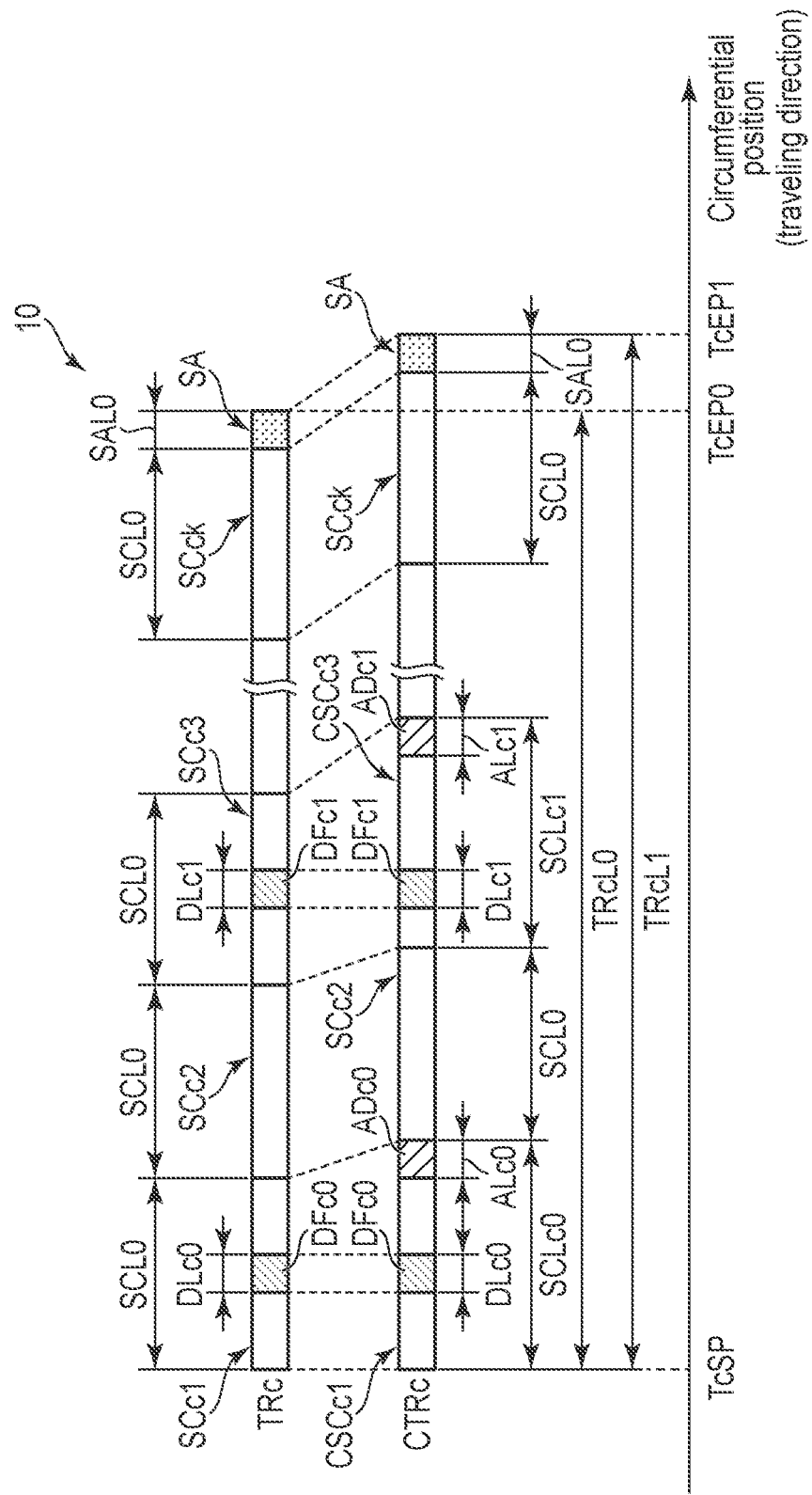
FIG. 7 is a schematic diagram showing an example of a track adjustment method when the sector adjustment process is performed on the defect sector.

FIG. 7 is a schematic diagram showing an example of an adjustment method of the track TRc when the sector adjustment process is performed on the defect sectors SCc1 and SCc3. FIG. 7 corresponds to part of FIG. 6. The horizontal axis of FIG. 7 shows the circumferential position TcSP, the circumferential position TcEP0, and the circumferential position TcEP1. In FIG. 7, the circumferential position TcEP1 is a circumferential position located in the traveling direction of the circumferential position TcEP0. In the example shown in FIG. 7, the track CTRc is disposed from the circumferential position TcSP to the circumferential position TcEP1. That is, the length TRcL1 of the track CTRc corresponds to the length in the circumferential direction from the circumferential position TcSP to the circumferential position TcEP1. The length TRcL1 is larger than the length TRcL0. The circumferential position TcEP1 corresponds to the end position of the track CTRc. In FIG. 7, for convenience of explanation, each of the tracks TRc and CTRc is shown in a strip shape extending in the circumferential direction with a constant track width, but practically, they are curved along the circumferential direction. In FIG. 7, the start position TcSP and the end position TcEP0 may not match. Further, in FIG. 7, the start position TcSP and the end position TcEP1 may not match.

In the example shown in FIG. 7, the adjustment unit 620 performs a process so as to be adjusted to the defect sector CSCc1 by adding additional information ADc0 to the defect sector SCc1. The adjustment unit 620, for example, redisposes (or resets) respective sectors that are consecutively disposed side by side after the sector SCc2 by shifting it in the traveling direction by the length ALc0 of the additional information ADc0. After executing the sector adjustment process on the defect sector SCc1, the adjustment unit 620 performs a process so as to be adjusted to the defect sector CSCc3 by adding additional information ADc1 to the defect sector SCc3. The adjustment unit 620, for example, redisposes (or resets) respective sectors that are consecutively disposed side by side after the sector SCc2 by shifting it in the traveling direction by the length ALc1 of the additional information ADc1. The adjustment unit 620 extends the length TRcL0 of the track TRc to the length TRcL1 of the track CTRc by performing the sector process on the defect sectors SCc1 and SCc3. When reading/writing the track CTRc with an extended length, the adjustment unit 620 increases the transfer speed.

Figure 8:
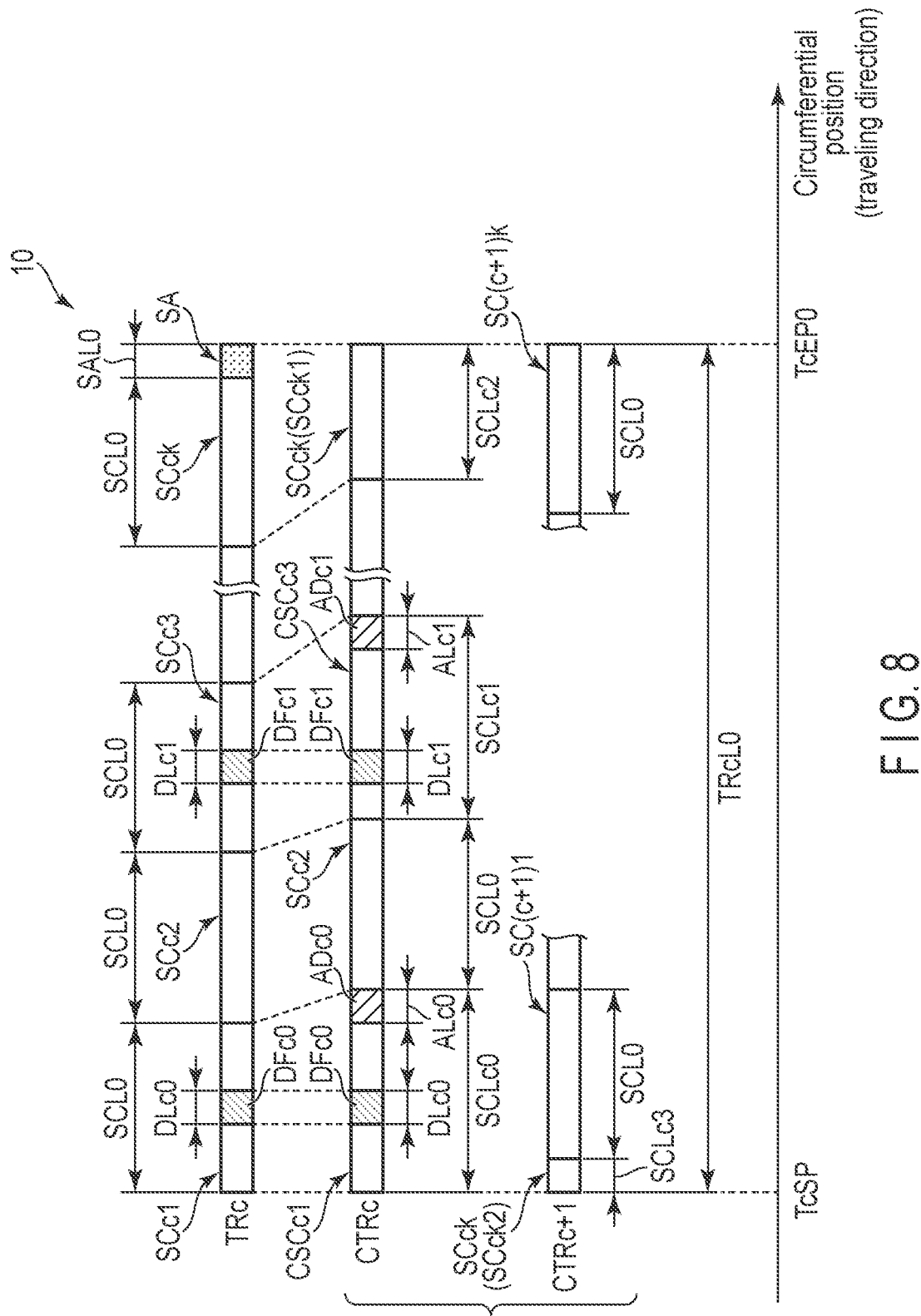
FIG. 8 is a schematic diagram showing an example of a track adjustment method when the sector adjustment process is performed on the defect sector.

FIG. 8 is a schematic diagram showing an example of an adjustment method of the track TRc when the sector adjustment process is performed on the defect sectors SCc1 and SCc3. FIG. 8 corresponds to part of FIG. 6. FIG. 8 shows the track TRc, the track CTRc, and the track CTRc+1. Track CTRc+1 is adjacent to the track CTRc in the radial direction. In the example shown in FIG. 8, the track CTRc+1 is disposed from the circumferential position TcSP to the circumferential position TcEP0. The circumferential position TcSP corresponds to the start position of the track CTRc+1, and the circumferential position TcEP0 corresponds to the end position of the track CTRc+1. In FIG. 8, for convenience of explanation, the track CTRc+1 is shown as a band extending in the circumferential direction with a constant track width, but practically, it is curved along the circumferential direction.

In the example shown in FIG. 8, the track CTRc includes the defect sector CSCc1, the sector SCc2, the sector SCc3, . . . , and the sector SCck1. In the track CTRc, the defect sector CSCc1, the sector SCc2, the sector SCc3, . . . , and the sector SCck1 are consecutively disposed side by side in the order described in the traveling direction.

In FIG. 8, sector SCck1 corresponds to part of the sector SCck. The length SCLc2 of the sector SCck1 is less than, for example, the reference sector length SCL0. In an example, the length SCLc2 of the sector SCck1 is less than the reference sector length SCL0 by the length ALc0 of additional information ADc0 or the length ALc1 of additional information ADc1.

In the example shown in FIG. 8, track CTRc+1 includes the track SCck2, the sector SC(c+1), . . . , and the sector SC(c+1)k. In the track TRc+1, the sector SCck2, the sector SC(c+1), . . . , and the sector SC(c+1)k are consecutively disposed side by side in the order described in the traveling direction. In FIG. 8, the sector SCck2 corresponds to part of the sector SCck. For example, the sector SCck is constructed by combining the sector SCck1 with the sector SCck2. The length SCLc3 of the sector SCck2 is less than, for example, the reference sector length SCL0. In an example, the length SCLc3 of the sector SCck2 corresponds to the length ALc0 of additional information ADc0 or the length ALc1 of additional information ADc1.

In the example shown in FIG. 8, the adjustment unit 620 determines that the length SAL0 of the remaining sector SA is equal to or greater than the length ALc0 of the additional information ADc0 according to the length DLc0 of the defect DFc0, and performs a process so as to be adjusted (or changed) to the defect sector CSCc1 by adding the additional information ADc0 to the defect sector SCc1. The adjustment unit 620, for example, redisposes (or resets) respective sectors that are consecutively disposed side by side in the traveling direction after the sector SCc2 by shifting it in the traveling direction by the length ALc0 of the additional information ADc0. The adjustment unit 620 shifts the sector SCck in the traveling direction by the length ALc0 of the additional information ADc0 and replaces the remaining sector SA with part of the sector SCck.

When the sector adjustment process is performed on the defect sector SCc1, the adjustment unit 620 determines that the length of the remaining sector is less than the length of defect DFc1, because there is no remaining sector in the track CTRc, and performs a process so as to be adjusted (or changed) to the defect sector CSCc3 by adding the additional information ADc1 to the defect sector SCc3. The adjustment unit 620 shifts, for example, respective sectors that are consecutively disposed side by side in the traveling direction after the defect sector SCc3 in the traveling direction by the length ALc1 of the additional information ADc1, disposes the sector SCck1 which is part of the sector SCck at the end of the track CTRc (for example, the end position TcEP0), and disposes the sector SCck2, which is part of the remaining sector SCck that cannot be written to this adjustment target track at the beginning of the track CTRc+1 (for example, the start position TcSP).

In the example shown in FIG. 8, the track CTRc includes the defect sector CSCc1, the sector SCc2, the sector SCc3, . . . , and the sector SCck1. In the track CTRc, the defect sector CSCc1, the sector SCc2, the sector SCc3, . . . , and the sector SCck1 are consecutively disposed side by side in the order described in the traveling direction. In FIG. 8, sector SCck1 corresponds to part of the sector SCck. The length SCLc2 of the sector SCck1 is less than, for example, the reference sector length SCL0. In an example, the length SCLc2 of the sector SCck1 is less than the reference sector length SCL0 by the length ALc0 of additional information ADc0 or the length ALc1 of additional information ADc1.

In the example shown in FIG. 8, track CTRc+1 includes the track SCck2, the sector SC(c+1), . . . , and the sector SC(c+1)k. In the track TRc+1, the sector SCck2, the sector SC(c+1), . . . , and the sector SC(c+1)k are consecutively disposed side by side in the order described in the traveling direction. In FIG. 8, the sector SCck2 corresponds to part of the sector SCck. For example, the sector SCck is constructed by combining the sector SCck1 with the sector SCck2. The length SCLc3 of the sector SCck2 is less than, for example, the reference sector length SCL0. In an example, the length SCLc3 of the sector SCck2 corresponds to the length ALc0 of additional information ADc0 or the length ALc1 of additional information ADc1.

In the example shown in FIG. 8, the adjustment unit 620 determines that the length SAL0 of the remaining sector SA is equal to or greater than the length ALc0 of the additional information ADc0 according to the length DLc0 of the defect DFc0, and performs a process so as to be adjusted (or changed) to the defect sector CSCc1 by adding the additional information ADc0 to the defect sector SCc1. The adjustment unit 620, for example, redisposes (or resets) respective sectors that are consecutively disposed side by side in the traveling direction after the sector SCc2 by shifting it in the traveling direction by the length ALc0 of the additional information ADc0. The adjustment unit 620 shifts the sector SCck in the traveling direction by the length ALc0 of the additional information ADc0 and replaces the remaining sector SA with part of the sector SCck.

When the sector adjustment process is performed on the defect sector SCc1, the adjustment unit 620 determines that the length of the remaining sector is less than the length of defect DFc1, because there is no remaining sector in the track CTRc, and performs a process so as to be adjusted (or changed) to the defect sector CSCc3 by adding the additional information ADc1 to the defect sector SCc3. The adjustment unit 620 redisposes (or resets) respective sectors that are consecutively disposed side by side in the traveling direction after the defect sector SCc3, for example, in the track CTRc by shifting it in the traveling direction by the length ALc1 of the additional information ADc1, disposes the sector SCck1, which is part of the sector SCck, at the end of the track CTRc (for example, the end position TcEP0), disposes the sector SCck2, which is part of the sector SCck that cannot be written to track CTRc, at the beginning of the track CTRc+1 (for example, the start position TcSP), and redisposes (or resets) respective sectors that are consecutively disposed side by side in the traveling direction after the sector SC(C+1)1 in the track CTRc+1 by shifting it in the traveling direction by the length ALc1 of the additional information ADc1.

Figure 9:
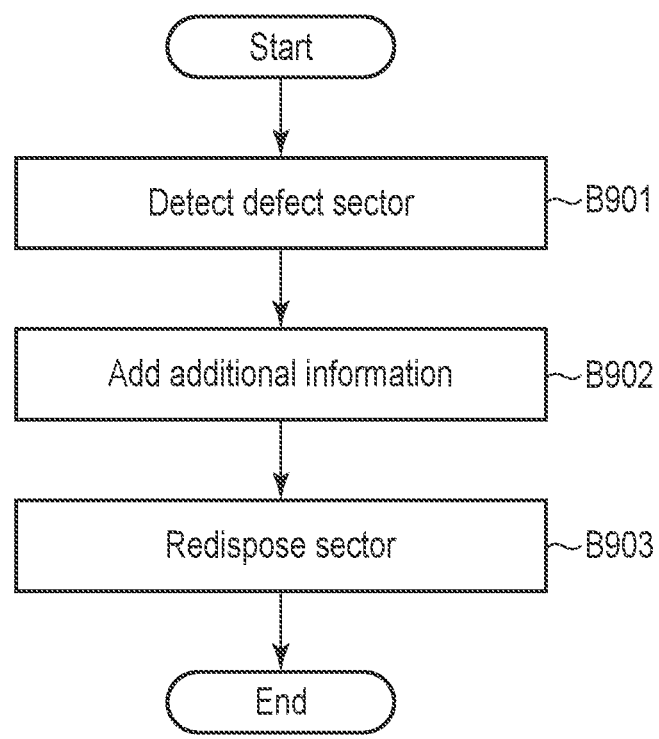
FIG. 9 is a flowchart showing an example of the sector adjustment method according to the first embodiment.

FIG. 9 is a flowchart showing an example of the sector adjustment method according to the present embodiment.

The system controller 130 detects the defect sector of a particular track by referring to the defect map or the like (B901). The system controller 130 extends the length of the defect sector by adding additional information having the length of the additional information according to the length of the defect of the defect sector, for example, additional correction information, to the defect sector (B902). The system controller 130 redisposes a plurality of sectors consecutively disposed side by side in the traveling direction after the defect sector to which the additional information is added by shifting it by the length of the additional information in the traveling direction (B903), and ends the process.

According to the present embodiment, the magnetic disk device 1 detects the defect sector of a particular track by referring to the defect map or the like. The magnetic disk device 1 extends the length of the defect sector by adding additional information having the length of the additional information according to the length of the defect of the defect sector, for example, additional correction information, to the defect sector. The magnetic disk device 1 redisposes a plurality of sectors consecutively disposed side by side in the traveling direction after the defect sector to which the additional information is added by shifting it by the length of the additional information in the traveling direction. The magnetic disk device 1 can improve the error correction capability by adding additional correction information according to the length of the defect to the defect sector. Therefore, the magnetic disk device 1 can improve the reliability.

Next, a magnetic disk device according to modifications and another embodiment will be described. In the modifications and another embodiment, the same reference numerals are attached to the same parts as those in the first embodiment, and a detailed description thereof will be omitted.

Modification 1

The magnetic disk device 1 according to the modification 1 is different from the magnetic disk device 1 of the first embodiment described above in the sector adjustment processing method.

The system controller 130 adjusts (or changes) the sector length of each defect sector according to the position and length of the defect in each defect sector, and characteristics (hereinafter, may be referred to as the sector characteristics) such as the error rate of each defect sector (for example, Bit Error Rate: BER), the floating fluctuation of the head 15 in each defect sector, and the position shift in the core shift correction of the head 15 in each defect sector. For example, the system controller 130 adjusts (or changes) the sector length of the defect sector based on the position and length of the defect and the sector characteristics. The system controller 130 adjusts (or changes) the sector length of this defect sector by adding the additional correction information according to the position and length of the defect and the sector characteristics to this defect sector. The system controller 130 adds the additional correction information according to the position and length of the defect and the sector characteristics to this defect sector to extend the length of the correction information of this defect sector to extend the sector length of this defect sector, compared with the reference sector length. The system controller 130 may measure the sector characteristics of each sector, for example, the error rate of the defect sector including the defect, the floating fluctuation of head 15 in this defect sector, the position shift in the core shift correction of the head 15 in this defect sector, and the like in advance to record these measured sector characteristics in a particular recording area, for example, the system region 10b of the disk 10, the volatile memory 70, the nonvolatile memory 80, the buffer memory 90, and the like.

Figure 10:
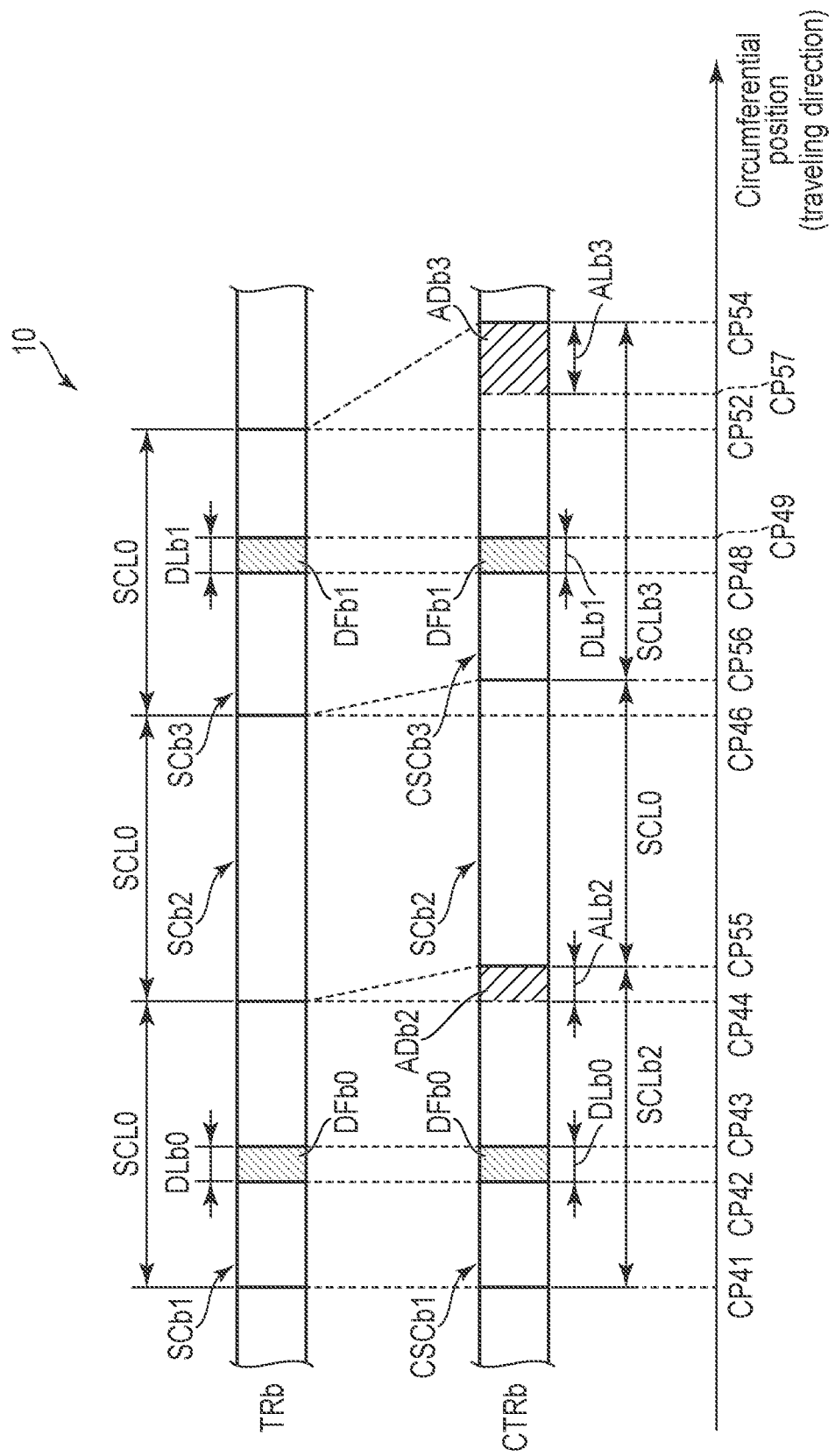
FIG. 10 is a schematic view showing an example of the sector adjustment method of the defect sector according to a modification 1.

FIG. 10 is a schematic diagram showing an example of a sector adjustment method of the defect sectors SCb1 and SCb3 according to the modification 1. FIG. 10 corresponds to part of FIG. 4. The horizontal axis of FIG. 10 shows the circumferential positions CP55, CP56, and CP57. The circumferential position CP55 is a circumferential position between the circumferential positions CP44 and CP46. The circumferential position CP56 is a circumferential position between the circumferential positions CP46 and CP48. The circumferential position CP57 is a circumferential position between the circumferential positions CP52 and CP54. In the example shown in FIG. 10, the defect sector SCb3 includes the defect DFb1.

In the example shown in FIG. 10, the defect sector CSCb1 includes the defect DFb0 and additional information, for example, additional correction information ADb2. The defect sector CSCb3 includes the defect DFb1 and additional information, for example, additional correction information ADb3. In FIG. 10, the defect sector CSCb1 has a sector length SCLb2. The sector length SCLb2 is longer than the reference sector length SCL0. The length ALb2 of the additional information ADb2 is different from, for example, the length DLb0 of defect DFb0. The length ALb2 of the additional information ADb2 may be the same as the length DLb of the defect DFb0. In FIG. 10, the defect sector CSCb3 has a sector length SCLb3. The sector length SCLb3 is longer than the reference sector length SCL0. The length ALb3 of the additional information ADb3 is different from, for example, the length DLb1 of defect DFb1. The length ALb3 of the additional information ADb3 may be the same as the length DLb1 of the defect DFb1, for example. The length ALb2 of the additional information ADb2 and the length ALb3 of the additional information ADb3 are different. The length ALb2 of the additional information ADb2 and the length ALb3 of the additional information ADb3 may be the same. In FIG. 10, the defect sector CSCb1 is disposed from the circumferential position CP41 to the circumferential position CP55. That is, the sector length SCLb2 of the defect sector SCb1 corresponds to the length in the circumferential direction from the circumferential position CP41 to the circumferential position CP55. The additional information ADb2 is disposed in the defect sector SCb1 from the circumferential position CP44 to the circumferential position CP55. That is, the length ALb2 of the additional information ADb2 corresponds to the length in the circumferential direction from the circumferential position CP44 to the circumferential position CP55. The defect sector CSCb3 is disposed from the circumferential position CP56 to the circumferential position CP54. That is, the sector length SCLb3 of the defect sector CSCb3 corresponds to the length in the circumferential direction from the circumferential position CP56 to the circumferential position CP54. Additional information ADb3 is disposed in the defect sector CSCb3 from the circumferential position CP57 to the circumferential position CP54. That is, the length ALb3 of the additional information ADb3 corresponds to the length in the circumferential direction from the circumferential position CP57 to the circumferential position CP54.

In the example shown in FIG. 10, the system controller 130 adds the additional information ADb2 having the length ALb2 of the additional information ADb2 according to the length DLb0 of the defect DFb and the sector characteristics of the defect sector SCb1 including the defect DFb0 to the defect sector SCb1 where the defect DFb0 registered in the defect map is located to perform a process so as to be adjusted to the defect sector CSCb1. In other words, the adjustment unit 620 adds the additional information ADb2 having the length ALb2 of the additional information ADb2 according to the length DLb0 of the defect DFb and the sector characteristics of the defect sector SCb1 including the defect DFb0 to the defect sector SCb1 where the defect DFb0 registered in the defect map is located to extend the length SCL0 of the defect sector SCc1 to the length SCLb2 of the defect sector CSCb1. The adjustment unit 620 redisposes (or resets), for example, according to the sector adjustment process of the defect sector SCb1, respective sectors that are consecutively disposed side by side in the traveling direction after the sector SCb2 by shifting it in the traveling direction by the length ALb2 of the additional information ADb2.

In the example shown in FIG. 10, the system controller 130 adds the additional information ADb3 having the length ALb3 of the additional information ADb3 according to the length DLb1 of the defect DFb1 and the sector characteristics of the defect sector SCb3 including the defect DFb1 to the defect sector SCb3 where the defect DFb1 registered in the defect map is located to perform a process so as to be adjusted to the defect sector CSCb3. In other words, the adjustment unit 620 adds the additional information ADb3 having the length ALb3 of the additional information ADb3 according to the length DLb1 of the defect DFb1 and the sector characteristics of the defect sector SCb3 including the defect DFb1 to the defect sector SCb3 where the defect DFb1 registered in the defect map is located to extend the length SCL0 of the defect sector SCc3 to the length SCLb3 of the defect sector CSCb3. The adjustment unit 620 redisposes (or resets), for example, according to the sector adjustment process of the defect sector SCb3, respective sectors that are consecutively disposed side by side in the traveling direction after the sector SCb3 in the traveling direction by shifting it in the traveling direction by the length ALb3 of the additional information ADb3.

According to the modification 1, the magnetic disk device 1 adds the additional correction information according to the position and length of the defect and the sector characteristics such as the error rate of the defect sector including this defect, the floating fluctuation of head 15 in this defect sector, the position shift in the core shift correction of the head 15 in this defect sector, and the like to this defect sector to adjust (or change) the sector length of this defect sector. The magnetic disk device 1 can improve the error correction capability by adding the additional correction information as described above to the defect sector. Therefore, the magnetic disk device 1 can improve the reliability.

Modification 2

The magnetic disk device 1 according to the modification 2 is different from the magnetic disk device 1 of the first embodiment and the modification 1 described above in the reading method.

The system controller 130 (R/W channel 60) refers to the defect map, etc., to write a pattern other than data such as user data or a pattern different from other data (hereinafter, may be referred to as a defect pattern), for example, a single pattern or a random pattern to the defect (defect region). When the system controller 130 (R/W channel 60) reads (or detects) the defect pattern, the system controller 130 stops (or freezes) the signal process of the defect pattern in the R/W channel 60 and does not read the defect pattern. In other words, when the system controller 130 (R/W channel 60) reads (or detects) a defect pattern, the system controller 130 stops the read process in the R/W channel 60. Hereinafter, a "process of stopping the signal process of read data and not reading read data" or a "process of stopping the read process" may be referred to as a "read stop process". For example, when the system controller 130 does not read (or detect) the defect pattern, it performs the read process.

FIG. 11 is a schematic view showing an example of the read stop process according to the modification 2. FIG. 11 shows the track CTRb shown in FIG. 5. Defect patterns are written to the defects DFb0, DFb1, and DFb2 of the track CTRb in FIG. 11. FIG. 11 shows the read data corresponding to the track CTRb. In the read data of FIG. 11, the shaded part indicates that the read stop process is being performed.

The system controller 130 reads the track CTRb from the circumferential position CP41 to the circumferential position CP42. When the system controller 130 reads the defect pattern written to the defect DFb0 from the circumferential position CP41 to CP43, the system controller 130 stops reading the defect DFb0. The system controller 130 reads the track CTRb from the circumferential position CP43 to the circumferential position CP48. When the system controller 130 reads the defect pattern written to the defect DFb1 from the circumferential position CP48 to CP49, the system controller 130 stops reading the defect DFb1. The system controller 130 reads the track CTRb from the circumferential position CP49 to the circumferential position CP50. When the system controller 130 reads the defect pattern written to the defect DFb1 from the circumferential position CP50 to CP51, the system controller 130 stops reading the defect DFb1. The system controller 130 reads the track CTRb from the circumferential position CP51 to the circumferential position CP54.

Figure 12:
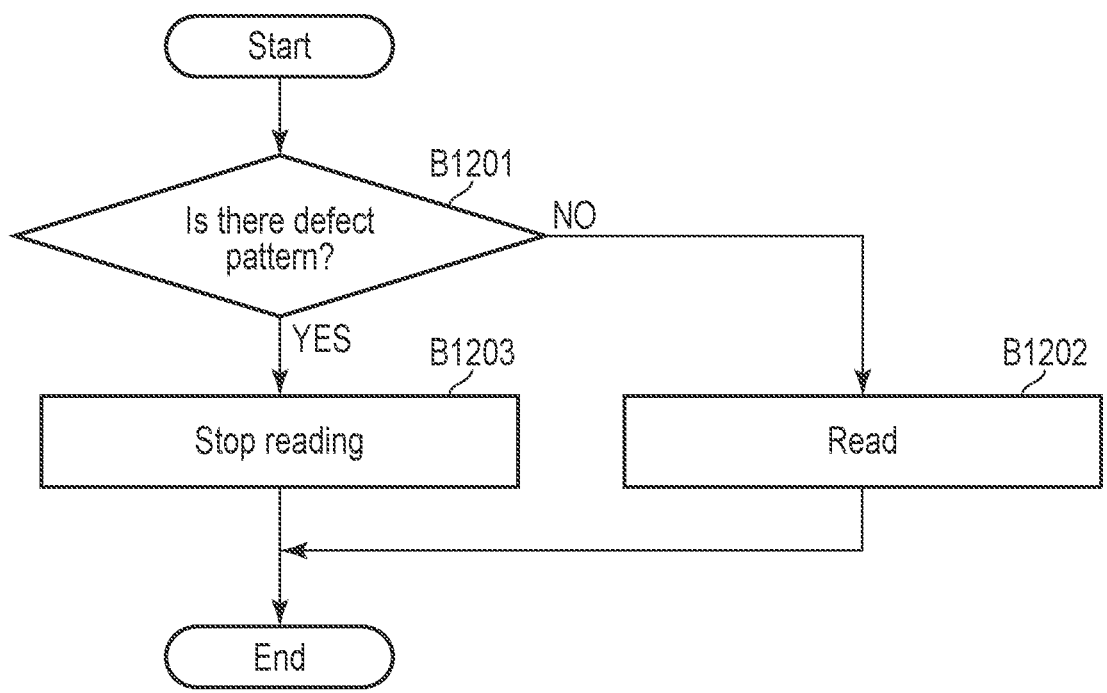
FIG. 12 is a flowchart showing an example of the read stop process according to the modification 2.

FIG. 12 is a flowchart showing an example of the read stop process according to the modification 2.

The system controller 130 determines whether there is a defect pattern in a particular region of a particular sector of a particular track (B1201). When it is determined that there is no defect pattern in this region (NO in B1201), the system controller 130 reads this region and ends the process. When it is determined that there is a defect pattern in this region, the system controller 130 stops (freezes) the signal process of the data written in this region, stops reading (B1203), and ends the processing.

According to the modification 2, the magnetic disk device 1 writes a defect pattern, for example, a single pattern or a random pattern, to the defect by referring to the defect map or the like. When the magnetic disk device 1 reads the defect pattern, the magnetic disk device 1 stops (or freezes) the signal process of the defect pattern in the R/W channel 60 and does not read the defect pattern. The magnetic disk device 1 can use a sector other than a sector having the defect without disabling all the sectors having the defect as a bad sector. Therefore, the magnetic disk device 1 can improve the format efficiency.

Second Embodiment

The magnetic disk device 1 according to the second embodiment is different from the magnetic disk device 1 of the first embodiment, the modification 1, and the modification 2 described above in the sector adjustment method.

FIG. 13 is a block diagram showing a configuration of the magnetic disk device 1 according to the second embodiment, FIG. 14 is a schematic view showing an example of the configuration of a particular sector SCd according to the second embodiment, and FIG. 15 is a schematic diagram showing an example of the configuration of a particular sector SCe according to the second embodiment.

FIG. 14 shows the particular sector SCd written to the particular track TRa on the disk 10.

In FIG. 14, the sector SCd includes servo data (or servo sector), user data, and correction information. The sector SCd may include data other than the servo data, the user data, and the correction information. In FIG. 14, in the sector SCd, the servo data, the user data, and the correction information are disposed in the traveling direction in the order of description. In other words, in the sector SCd, the user data is disposed in the traveling direction of the servo data, and the correction information is disposed in the traveling direction of the user data. The servo data, the user data, and the correction information may be disposed differently from the example shown in FIG. 14. The sector length SCL1 of the sector SCd is larger than the reference sector length SCL0. In FIG. 14, the sector length SCL1 of the sector SCd corresponds to the sum of the servo data length SVL0, the user data length UDL0, and the correction information length CTL1. The correction information length CTL1 is larger than the correction information length CTL0.

FIG. 15 shows the particular sector SCe written to the particular track TRa on the disk 10.

In FIG. 15, the sector SCe includes servo data (or servo sector), user data, and correction information. Note that the sector SCe may include data other than the servo data, the user data, and the correction information. In FIG. 15, in the sector SCe, the servo data, the user data, and the correction information are disposed in the traveling direction in the order of description. In other words, in the sector SCd, the user data is disposed in the traveling direction of the servo data, and the correction information is disposed in the traveling direction of the user data. The servo data, the user data, and the correction information may be disposed differently from the example shown in FIG. 15. The sector length SCL2 of the sector SCe is less than the reference sector length SCL0. In FIG. 15, the sector length SCL2 of the sector SCe corresponds to the sum of the servo data length SVL0, the user data length UDL0, and the correction information length CTL2. The correction information length CTL2 is less than the correction information length CTL0.

The R/W channel 60 has the adjustment unit 620. The adjustment unit 620 adjusts (or changes) the sector length of each sector according to the characteristics during the read process and the write process of each sector (hereinafter, may be referred to as the read/write characteristics), such as unevenness of the recording layer of the disk 10, the floating fluctuation of the head 15 in each sector of the disk 10, and the trajectory shift of the head 15 in each sector of the disk 10. The R/W channel 60 adjusts (or changes) each sector length of each sector so as to keep the error rate constant within a particular track and maintain the length of this track.

For example, when the adjustment unit 620 determines that the error rate of a particular sector is not good (or the error rate is large) because the read/write characteristics of the particular sector are not good (bad), the adjustment unit 620 increases the correction information for this sector to extend the sector length of this sector. In an example, when it is determined that the error rate of this sector is not better (or higher) than the error rate as a reference corresponding to this sector (hereinafter, may be referred to as an error rate threshold value) because the read/write characteristics of the particular sector is not better than the read/write characteristics as a reference (hereinafter, may be referred to as the reference read/write characteristics) corresponding to this sector, the adjustment unit 620 adds the additional correction information to the correction information of this sector to extend the sector length of this sector, compared with the reference sector length.

For example, when it is determined that the error rate of a particular sector is the same as the error rate threshold value corresponding to this sector because the read/write characteristics of the particular sector is the reference read/write characteristics, the adjustment unit 620 maintains the sector length of this sector at the reference sector length.

For example, when the adjustment unit 620 determines that the error rate of a particular sector is good (or the error rate is small) because the read/write characteristics of the particular sector are good, the adjustment unit 620 decreases the correction information for this sector to shorten the sector length of this sector. In an example, when it is determined that the error rate of a particular sector is better than the error rate threshold value corresponding to this sector because the read/write characteristics of the particular sector is better than the reference read/write characteristics corresponding to this sector, the adjustment unit 620 reduces the particular correction information (hereinafter, may be referred to as reduction correction information) from the correction information of this sector to shorten the sector length of this sector, compared with the reference sector length.

For example, when the sector adjustment process is performed on a particular track, the adjustment unit 620 adjusts the sector length of each sector of this track so as to maintain the length of this track. In an example, when the sector adjustment process is performed on a particular track, the adjustment unit 620 adds the additional correction information of the particular length to the particular sector of this track to extend the sector length of this sector, compared with the reference sector length, reduces, from a sector different from the extended sector of this track, the reduction correction information having a length same as the length of the additional correction information added to this extended sector, shortens the sector length of other sectors, compared with the reference sector length, and maintains the length of this track at the reference track length.

FIG. 16 is a diagram showing an example of an error rate change ERL in each sector of a particular track. The horizontal axis of FIG. 16 corresponds to the sector of a particular track, in other words, the circumferential position. On the horizontal axis of FIG. 16, it goes in the traveling direction as it goes toward the tip of the arrow. The horizontal axis of FIG. 16 shows the circumferential positions CP161, CP162, CP163, CP164, CP165, and CP166. In FIG. 16, the circumferential positions CP161, CP162, CP163, CP164, CP165, and CP166 are positions disposed in the order of description along the traveling direction. The circumferential position CP162 is a circumferential position in the traveling direction of the circumferential position CP161, the circumferential position CP163 is a circumferential position in the traveling direction of the circumferential position CP162, the circumferential position CP164 is a circumferential position in the traveling direction of the circumferential position CP163, the circumferential position CP165 is a circumferential position in the traveling direction of the circumferential position CP164, and the circumferential position CP166 is a circumferential position in the traveling direction of the circumferential position CP165. The vertical axis of FIG. 16 corresponds to an error rate (for example, Bit Error Rate: BER). On the vertical axis of FIG. 16, the error rate increases (that is, the error rate is worse or the read/write characteristics is worse) as it goes toward the tip of the arrow indicating large, and decreases (that is, the error rate is better or the read/write characteristics become better) it goes toward the tip of the arrow indicating small. The vertical axis of FIG. 16 shows an error rate threshold value THL. In FIG. 16, the error rate threshold value THL is constant in each sector (or each circumferential position). The error rate threshold value THL may be different for each sector. FIG. 16 shows the error rate change (hereinafter, may be simply referred to as an error rate change) ERL for each sector (or each circumferential position) of the particular track. In FIG. 16, the error rate change ERL is less than the error rate threshold value THL between the circumferential position CP161 and the circumferential position CP162, is approximately the error rate threshold value THL between the circumferential position CP162 and the circumferential position CP163, is larger than the error rate threshold value THL between the circumferential position CP163 and the circumferential position CP164, and is less than the error rate threshold value THL between the circumferential position CP165 and the circumferential position CP166.

In the example shown in FIG. 16, the adjustment unit 620 determines that the error rate of each sector between the circumferential position CP161 and the circumferential position CP162 is less than the error rate threshold value THL, that is, the read/write characteristics of the sector are better than the reference read/write characteristics, the adjustment unit 620 reduces the reduction correction information from the correction information of the sector according to the read/write characteristics of each sector between the circumferential position CP161 and the circumferential position CP162, and as shown in FIG. 15, shortens the sector length of the sector, compared with the reference sector length shown in FIG. 3.

In the example shown in FIG. 16, the adjustment unit 620 determines that the error rate of each sector between the circumferential position CP162 and the circumferential position CP163 is almost the same as the error rate threshold value THL, that is, the read/write characteristics in the sector are the reference read/write characteristics, the adjustment unit 620 maintains the sector length of each sector between the circumferential position CP162 and the circumferential position CP163 at the reference sector length shown in FIG. 3.

In the example shown in FIG. 16, the adjustment unit 620 determines that the error rate of each sector between the circumferential position CP163 and the circumferential position CP164 is larger than the error rate threshold value THL, that is, the read/write characteristics in the sector are not better than the reference read/write characteristics, the adjustment unit 620 adds the additional correction information to the correction information of the sector according to the read/write characteristics of each sector between the circumferential position CP163 and the circumferential position CP164, and as shown in FIG. 14, extends the sector length of the sector, compared with the reference sector length shown in FIG. 3.

In the example shown in FIG. 16, the adjustment unit 620 determines that the error rate of each sector between the circumferential position CP165 and the circumferential position CP166 is less than the error rate threshold value THL, that is, the read/write characteristics in the sector are better than the reference read/write characteristics, the adjustment unit 620 reduces the reduction correction information from the correction information of the sector according to the read/write characteristics of each sector between the circumferential position CP165 and the circumferential position CP166, and as shown in FIG. 15, shortens the sector length of these sectors, compared with the reference sector length shown in FIG. 3.

In the example shown in FIG. 16, when the sector adjustment process is performed on a particular track, the adjustment unit 620 adjusts the sector length of each sector of this track so as to maintain the length of this track at the reference track length.

FIG. 17 is a flowchart showing an example of a sector adjustment method according to the second embodiment.

The system controller 130 determines whether the error rate of a particular sector of a particular track is greater than the error rate threshold value corresponding to this sector (B1701). When the error rate of this sector is not greater than the error rate threshold value for this sector (NO in B1701), the system controller 130 determines whether the error rate of this sector is less than the error rate threshold value corresponding to this sector (B1702).

When it is determined that the error rate of this sector is not less than the error rate threshold value corresponding to this sector, that is, the error rate of this sector is approximately the same as the error rate threshold value corresponding to this sector (NO in B1702), the system controller 130 maintains the sector length of this sector at the reference sector length (B1703), and ends the process. When it is determined that the error rate of this sector is less than the error rate threshold value corresponding to this sector (YES in B1702), the system controller 130 reduces the reduction correction information from the correction information of this sector, makes the sector length of this sector smaller less than the reference sector length (B1704), and ends the process. For example, the system controller 130 makes the sector length of this sector of this track smaller than the reference sector length so as to maintain the length of this track.

When it is determined that the error rate of this sector is greater than the error rate threshold value corresponding to this sector (YES in B1701), the system controller 130 adds the additional correction information to the correction information of this sector, makes the sector length of this sector larger than the reference sector length (B1705), and ends the process. For example, the system controller 130 makes the sector length of this sector of this track larger than the reference sector length so as to maintain the length of this track.

According to the second embodiment, when it is determined that the error rate of a particular sector is less than the error rate threshold value corresponding to this sector because the read/write characteristics of the particular sector of the particular track is not good, the magnetic disk device 1 reduces the reduction correction information from the correction information of this sector to make the sector length of this sector smaller than the reference sector length. When the magnetic disk device 1 determines that the error rate of this sector is substantially the same as the error rate threshold value corresponding to this sector, the magnetic disk device 1 maintains the sector length of this sector at the reference sector length. When it is determined that the error rate of this sector is greater than the error rate threshold value corresponding to this sector because the read/write characteristics of this sector is good, the magnetic disk device 1 adds the additional correction information to the correction information of this sector to make the sector length of this sector larger than the reference sector length. When the magnetic disk device 1 performs the sector adjustment process on this track, the magnetic disk device 1 adjusts the sector length of each sector of this track so as to maintain the length of this track. The magnetic disk device 1 can improve the error correction capability. Therefore, the magnetic disk device 1 can improve the reliability.

An example of the magnetic disk device obtained from the configuration disclosed in the present specification and the sector adjustment method is added below:

(1) A magnetic disk device comprising: a disk having a first sector including first servo data, first user data, and first correction information used to correct a data error; a head that writes data to the disk and that reads data from the disk; and a controller that changes, according to a first defect length of a defect generated in the first sector in a circumferential direction of the disk, a first sector length of the first sector in the circumferential direction.

(2) The magnetic disk device according to (1), wherein the controller extends the first sector length according to the first defect length.

(3) The magnetic disk device according to (1), wherein the controller adds first additional information to the first correction information according to the first defect length.

(4) The magnetic disk device according to (3), wherein a first information length of the first additional information in the circumferential direction is the same as the first defect length.

(5) The magnetic disk device according to (4), wherein when a first track including the first sector has a remainder region having a length equal to or larger than the first information length in the circumferential direction, the controller shifts a plurality of sectors consecutively disposed after the first sector in the first track by the first information length in the circumferential direction.

(6) The magnetic disk device according to (4), wherein when a first track including the first sector does not have a remainder region having a length equal to or larger than the first information length in the circumferential direction, the controller does not extend the first sector length.

(7) The magnetic disk device according to (2), wherein the controller extends the first sector length according to a characteristic including an error rate of the first sector, a floating fluctuation of the head in the first sector, and a position shift in a core shift correction of the head in the first sector.

(8) The magnetic disk device according to (1), wherein the controller writes a pattern different from the first sector other than the defect to the defect, and stops a read process when the pattern is detected.

(9) A magnetic disk device comprising: a disk having a first sector including first servo data, first user data, and first correction information used when an error correction for data is performed; a head that writes data to the disk and that reads data from the disk; and a controller that changes a first sector length of the first sector in a circumferential direction of the disk according to a read/write characteristic, during a write process and a read process, including a recording layer unevenness of the disk, a floating fluctuation of the head in the first sector, and a trajectory shift of the head in the first sector.

(10) The magnetic disk device according to (9), wherein the controller adds first additional information to the first correction information when a first error rate of the first sector is larger than a first threshold value.

(11) The magnetic disk device according to (9), wherein the controller reduces first reduction information from the first correction information when the first error rate of the first sector is less than the first threshold value.

(12) A sector processing method applied to a magnetic disk device including a disk having a first sector including first servo data, first user data, and first correction information used to correct a data error, and a head that writes data to the disk and that reads data from the disk, the method comprising: changing, according to a first defect length of a defect generated in the first sector in a circumferential direction of the disk, a first sector length of the first sector in the circumferential direction.

(13) A sector processing method applied to a magnetic disk device including a disk having a first sector including first servo data, first user data, and first correction information used when an error correction for data is performed, a head that writes data to the disk and that reads data from the disk, the method including changing a first sector length of the first sector in a circumferential direction of the disk according to a read/write characteristic, during a write process and a read process, including a recording layer unevenness of the disk, a floating fluctuation of the head in the first sector, and a trajectory shift of the head in the first sector.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk having a first sector including first servo data, first user data, and first correction information used to correct a data error;
   a head that writes data to the disk and that reads data from the disk; and
   a controller that changes, according to a first defect length of a defect generated in the first sector in a circumferential direction of the disk, a first sector length of the first sector in the circumferential direction, wherein
   the controller adds first additional information to the first correction information according to the first defect length, and
   a first information length of the first additional information in the circumferential direction is the same as the first defect length.

2. The magnetic disk device according to claim 1, wherein when a first track including the first sector has a remainder region having a length equal to or larger than the first information length in the circumferential direction, the controller shifts a plurality of sectors consecutively disposed after the first sector in the first track by the first information length in the circumferential direction.

3. The magnetic disk device according to claim 1, wherein when a first track including the first sector does not have a remainder region having a length equal to or larger than the first information length in the circumferential direction, the controller does not extend the first sector length.

4. A magnetic disk device comprising:
   a disk having a first sector including first servo data, first user data, and first correction information used to correct a data error;
   a head that writes data to the disk and that reads data from the disk; and
   a controller that changes, according to a first defect length of a defect generated in the first sector in a circumferential direction of the disk, a first sector length of the first sector in the circumferential direction, wherein
   the controller extends the first sector length according to the first defect length, and
   the controller extends the first sector length according to a characteristic including an error rate of the first sector, a floating fluctuation of the head in the first sector, and a position shift in a core shift correction of the head in the first sector.

5. A magnetic disk device comprising:
a disk having a first sector including first servo data, first user data, and first correction information used to correct a data error;
a head that writes data to the disk and that reads data from the disk; and
a controller that changes, according to a first defect length of a defect generated in the first sector in a circumferential direction of the disk, a first sector length of the first sector in the circumferential direction, wherein
the controller writes a pattern different from the first sector other than the defect to the defect, and stops a read process when the pattern is detected.

6. A magnetic disk device comprising:
a disk having a first sector including first servo data, first user data, and first correction information used when an error correction for data is performed;
a head that writes data to the disk and that reads data from the disk; and
a controller that changes a first sector length of the first sector in a circumferential direction of the disk according to a read/write characteristic, during a write process and a read process, including a recording layer unevenness of the disk, a floating fluctuation of the head in the first sector, and a trajectory shift of the head in the first sector.

7. The magnetic disk device according to claim 6, wherein the controller adds first additional information to the first correction information when a first error rate of the first sector is larger than a first threshold value.

8. The magnetic disk device according to claim 7, wherein the controller extends the first sector length when the first error rate is larger than the first threshold value.

9. The magnetic disk device according to claim 6, wherein the controller reduces first reduction information from the first correction information when the first error rate of the first sector is less than the first threshold value.

10. The magnetic disk device according to claim 9, wherein the controller shortens the first sector length when the first error rate is less than the first threshold value.

11. A sector processing method applied to a magnetic disk device including a disk having a first sector including first servo data, first user data, and first correction information used to correct a data error, and a head that writes data to the disk and that reads data from the disk, the method comprising:
changing, according to a first defect length of a defect generated in the first sector in a circumferential direction of the disk, a first sector length of the first sector in the circumferential direction;
adding first additional information to the first correction information according to the first defect length; and
a first information length of the first additional information in the circumferential direction is the same as the first defect length.

12. The sector processing method according to claim 11, further comprising: when a first track including the first sector has a remainder region having a length equal to or larger than the first information length in the circumferential direction, shifting a plurality of sectors consecutively disposed after the first sector in the first track by the first information length in the circumferential direction.

13. The sector processing method according to claim 11, further comprising:
when a first track including the first sector does not have a remainder region having a length equal to or larger than the first information length in the circumferential direction, not extending the first sector length.

14. A sector processing method applied to a magnetic disk device including a disk having a first sector including first servo data, first user data, and first correction information used to correct a data error, and a head that writes data to the disk and that reads data from the disk, the method comprising:
changing, according to a first defect length of a defect generated in the first sector in a circumferential direction of the disk, a first sector length of the first sector in the circumferential direction;
extending the first sector length according to the first defect length; and
extending the first sector length according to a characteristic including an error rate of the first sector, a floating fluctuation of the head in the first sector, and a position shift in a core shift correction of the head in the first sector.

* * * * *